United States Patent
Iwata et al.

(10) Patent No.: US 10,365,750 B2
(45) Date of Patent: Jul. 30, 2019

(54) TRANSPARENT CONDUCTIVE FILM AND METHOD FOR PRODUCING SAME, INFORMATION INPUT DEVICE, AND ELECTRONIC DEVICE

(71) Applicant: Dexerials Corporation, Shinagawa-ku, Tokyo (JP)

(72) Inventors: Ryosuke Iwata, Tokyo (JP); Yasuhisa Ishii, Kanuma (JP); Mikihisa Mizuno, Utsunomiya (JP); Shinobu Hara, Utsunomiya (JP)

(73) Assignee: Dexerials Corporation, Shinagawa-ku, Tokyo (JP)

( * ) Notice: Subject to any disclaimer, the term of this patent is extended or adjusted under 35 U.S.C. 154(b) by 100 days.

(21) Appl. No.: 15/116,298

(22) PCT Filed: Jan. 26, 2015

(86) PCT No.: PCT/JP2015/052785
§ 371 (c)(1),
(2) Date: Aug. 3, 2016

(87) PCT Pub. No.: WO2015/115630
PCT Pub. Date: Aug. 6, 2015

(65) Prior Publication Data
US 2017/0010736 A1    Jan. 12, 2017

(30) Foreign Application Priority Data
Feb. 3, 2014    (JP) .................. 2014-018869

(51) Int. Cl.
*G06F 3/041* (2006.01)
*H01B 1/22* (2006.01)
*G06F 3/044* (2006.01)

(52) U.S. Cl.
CPC ............ *G06F 3/0416* (2013.01); *G06F 3/041* (2013.01); *G06F 3/044* (2013.01); *G06F 3/0412* (2013.01);
(Continued)

(58) Field of Classification Search
CPC . G06F 2203/04103; G06F 2203/04112; G06F 3/041; G06F 3/0412; G06F 3/0416; G06F 3/044; H01B 1/22
See application file for complete search history.

(56) References Cited

U.S. PATENT DOCUMENTS

2011/0281070 A1*  11/2011  Mittal ............. H01L 31/022466
                                                                      428/142
2012/0148823 A1*  6/2012  Chu ....................... B82Y 30/00
                                                                      428/292.1
(Continued)

FOREIGN PATENT DOCUMENTS

| CN | 102087884 A | 6/2011 |
| CN | 103493151 A | 1/2014 |

(Continued)

OTHER PUBLICATIONS

Aug. 22, 2017, Notification of Reasons for Refusal issued by the Japan Patent Office in the corresponding Japanese Patent Application No. 2014-018869.
(Continued)

*Primary Examiner* — Dmitriy Bolotin
(74) *Attorney, Agent, or Firm* — Kenja IP Law PC

(57) ABSTRACT

Provided is a metal nanowire-containing transparent conductive film that can efficiently inhibit scattering of external light at a display screen such as a touch panel, and improve black floating prevention (photopic contrast) and electrode pattern non-visibility. Also provided are a method for producing the transparent conductive film, an information input
(Continued)

device including the transparent conductive film, and an electronic device including the transparent conductive film. The transparent conductive film includes one or more metal nanowires and the number of metal nanowire bundle structures present in the transparent conductive film is 3 or fewer per each rectangular area region of 30 μm in height and 40 μm in width of the transparent conductive film.

17 Claims, 9 Drawing Sheets
(3 of 9 Drawing Sheet(s) Filed in Color)

(52) U.S. Cl.
CPC ..... *H01B 1/22* (2013.01); *G06F 2203/04103* (2013.01); *G06F 2203/04112* (2013.01)

(56) References Cited

U.S. PATENT DOCUMENTS

| | | | |
|---|---|---|---|
| 2013/0000952 A1* | 1/2013 | Srinivas | H01B 1/02 174/126.1 |
| 2013/0056244 A1* | 3/2013 | Srinivas | G06F 3/041 174/250 |
| 2013/0258568 A1* | 10/2013 | Iwata | H01B 1/22 361/679.01 |
| 2014/0099486 A1* | 4/2014 | Ollmann | G06F 3/041 428/201 |
| 2014/0110239 A1* | 4/2014 | Lee | G06F 3/044 200/600 |
| 2015/0111048 A1* | 4/2015 | Kim | H01B 1/22 428/457 |
| 2015/0170785 A1* | 6/2015 | Watt | C09D 11/52 428/457 |
| 2016/0208104 A1* | 7/2016 | Mizuno | C09B 49/00 |
| 2016/0346839 A1* | 12/2016 | Ishii | G06F 3/041 |

FOREIGN PATENT DOCUMENTS

| | | |
|---|---|---|
| JP | 2009129732 A | 6/2009 |
| JP | 2010507199 A | 3/2010 |
| JP | 2010525526 A | 7/2010 |
| JP | 2010525527 A | 7/2010 |
| JP | 2012185770 A | 9/2012 |
| JP | 2012190777 A | 10/2012 |
| JP | 2012190780 A | 10/2012 |
| JP | 2012216535 A | 11/2012 |
| JP | 2013211130 A | 10/2013 |
| JP | 2013214507 A | 10/2013 |
| JP | 2015146127 A | 8/2015 |
| TW | 200946266 A1 | 11/2009 |
| WO | 2009107694 A1 | 9/2009 |
| WO | 2013047197 A1 | 4/2013 |
| WO | 2014010270 A1 | 1/2014 |

OTHER PUBLICATIONS

Sep. 26, 2017, Notification of Reasons for Refusal issued by the Japan Patent Office in the corresponding Japanese Patent Application No. 2015-230814.
Apr. 28, 2015, International Search Report issued in the International Patent Application No. PCT/JP2015/052785.
Nov. 14, 2017, Office Action issued by the State Intellectual Property Office in the corresponding Chinese Patent Application No. 201580006986.6.
Apr. 28, 2017, Office Action issued by the State Intellectual Property Office in the corresponding Chinese Patent Application No. 201580006986.6.
Sep. 9, 2016, International Preliminary Report on Patentability issued in the International Patent Application No. PCT/JP2015/052785.
Feb. 20, 2018, Notification of Reasons for Refusal issued by the Japan Patent Office in the corresponding Japanese Patent Application No. 2015-230814.
Jan. 30, 2018, Notification of Reasons for Refusal issued by the Japan Patent Office in the corresponding Japanese Patent Application No. 2014-018869.
Aug. 9, 2018, Office Action issued by the State Intellectual Property Office in the corresponding Chinese Patent Application No. 201580006986.6.
Yuexin Han et al., "Powder Engineering", Teaching Guiding Committee for College Geology and Mineral Majors under the Ministry of Education Planning Teaching Materials for Mineral Processing Engineering Majors, Dec. 2011, p. 172.
May 8, 2018, Office Action issued by the State Intellectual Property Office in the corresponding Chinese Patent Application No. 201580006986.6.
Oct. 11, 2018, Office Action issued by the Taiwan Intellectual Property Office in the corresponding Taiwanese Patent Application No. 104103231.
Nov. 7, 2018, Office Action issued by the State Intellectual Property Office in the corresponding Chinese Patent Application No. 201580006986.6.
Baiqing Zhang et al., Food machinery and equipment, Jan. 1, 2012, pp. 136-137, Zhengzhou University Press.
Feb. 15, 2019, Office Action issued by the State Intellectual Property Office in the corresponding Chinese Patent Application No. 201580006986.6.

* cited by examiner

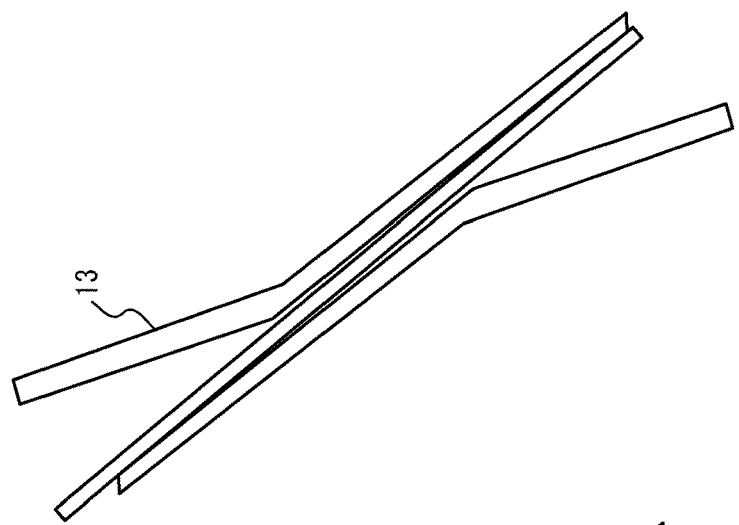
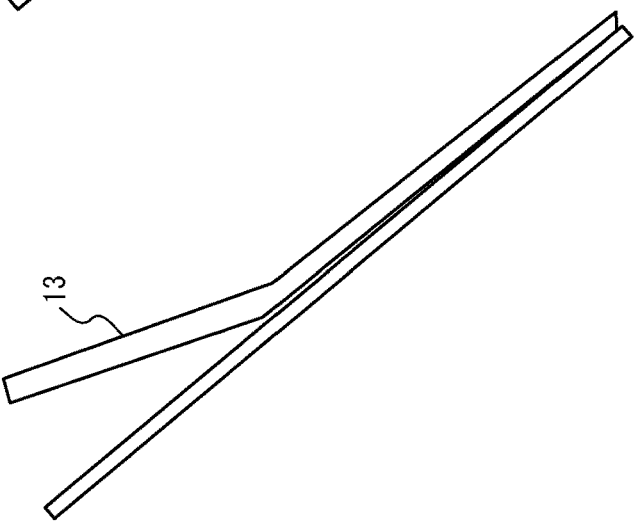
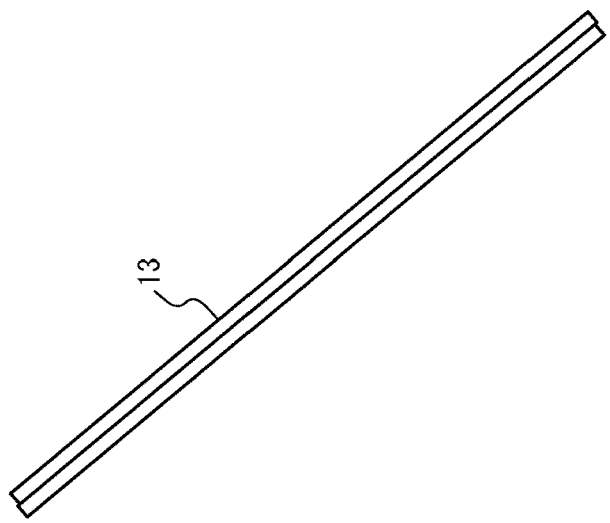

TRANSPARENT CONDUCTIVE FILM AND METHOD FOR PRODUCING SAME, INFORMATION INPUT DEVICE, AND ELECTRONIC DEVICE

CROSS-REFERENCE TO RELATED APPLICATION

The present application claims priority of Japanese Patent Application No. 2014-018869 (filed on Feb. 3, 2014), the entire disclosure of which is incorporated into the present application by reference.

TECHNICAL FIELD

The present disclosure relates to a transparent conductive film and a method for producing the same, an information input device, and an electronic device.

BACKGROUND

Transparent conductive films that are required to exhibit light transmittivity are conventionally made from metal oxides such as indium tin oxide (ITO). Examples of such transparent conductive films include a transparent conductive film disposed on a display surface of a display panel such as a touch panel, and a transparent conductive film of an information input device disposed at a display surface-side of a display panel. However, a transparent conductive film made using a metal oxide has expensive production costs as a result of being formed by sputtering in a vacuum environment and is susceptible to cracking and delamination due to deformation by bending, warping, or the like.

Consequently, transparent conductive films made using metal nanowires are being considered as an alternative to transparent conductive films made using metal oxides. This is because a transparent conductive film made using metal nanowires can be formed by coating or printing and is highly resistant to bending and warping. Moreover, transparent conductive films made using metal nanowires are attracting attention as next generation transparent conductive films that are made without using the rare metal indium (for example, refer to PTL 1 and 2).

However, a transparent conductive film described in PTL 1 may appear red and suffer from loss of transparency.

Furthermore, in a situation in which a transparent conductive film made using metal nanowires is disposed at a display surface-side of a display panel, diffuse reflection of external light by the surfaces of the metal nanowires causes black displayed by the display panel to appear slightly brighter, which may be referred to as a "black floating (black level misadjustment)" phenomenon. The black floating phenomenon is a factor that leads to deterioration in display characteristics due to reduced contrast.

A gold nanotube made using gold (Au) has been proposed with the objective of preventing occurrence of the black floating phenomenon since gold has a lower tendency to diffusely reflect light. A gold nanotube is formed by initially using a silver nanowire having a high tendency to diffusely reflect light as a template and subjecting the silver nanowire to gold plating. Thereafter, the silver nanowire portion used as the template is etched or oxidized to enable conversion to a gold nanotube (for example, refer to PTL 3).

Furthermore, a method for preventing light scattering has been proposed (for example, refer to PTL 2) in which metal nanowires are used in combination with a secondary conductive medium (for example, CNTs (carbon nanotubes), a conductive polymer, or ITO).

However, in the case of the gold nanotube obtained by the former of these methods, not only is the silver nanowire used as a template wasted as a material, but a metal material is also required to perform the gold plating. Therefore, this method suffers from high production costs due to having high material costs and a complicated process.

Furthermore, in the case of the latter of these methods, there may be loss of transparency due to the secondary conductive medium (colorant material), such as CNTs, a conductive polymer, or ITO, being located in openings in a metal nanowire network. In addition, this method suffers from high production costs due to having high material costs and a complicated process.

In order to combat these problems, a transparent conductive film has been proposed that includes metal nanowire bodies and a colored compound (dye) adsorbed onto the metal nanowire bodies (for example, refer to PTL 4 and 5).

CITATION LIST

Patent Literature

PTL 1: JP-T-2010-507199
PTL 2: JP-T-2010-525526
PTL 3: JP-T-2010-525527
PTL 4: JP-A-2012-190777
PTL 5: JP-A-2012-190780

SUMMARY

Technical Problem

The present disclosure aims to solve the various conventional problems described above and achieve the following objectives. Specifically, the present disclosure aims to provide a metal nanowire-containing transparent conductive film that can efficiently inhibit scattering of external light at a display screen such as a touch panel, and improve black floating prevention (photopic contrast) and electrode pattern non-visibility. The present disclosure also aims to provide a method for producing the transparent conductive film, an information input device including the transparent conductive film, and an electronic device including the transparent conductive film.

Solution to Problem

The present inventors discovered that a portion of an applied film in which metal nanowires aggregate and form a bundle (bundle structure (aggregate)) has a significant involvement in the black floating phenomenon and electrode pattern non-visibility.

The inventors conducted diligent investigation in order to achieve the above objectives and, as a result, found that scattering of external light can be inhibited by ensuring that the number of bundles (bundle structures) of metal nanowires in a film is no greater than a specific amount. These findings led to the present disclosure.

The present disclosure is based on the findings of the inventors described above and provides the following as a solution to the problem described above. Specifically, the present disclosure provides:

<1> A transparent conductive film including one or more metal nanowires, wherein the number of metal nanowire bundle structures present in the transparent conductive film is 3 or fewer per each rectangular area region of 30 μm in height and 40 μm in width (30 μm×40 μm) of the transparent conductive film.

The transparent conductive film described in <1> includes metal nanowires that can efficiently inhibit scattering of external light at a display screen such as a touch panel, and improve black floating prevention (photopic contrast) and electrode pattern non-visibility.

Herein, a "bundle structure" is defined as a structure in which two or more metal nanowires are partially or completely in line contact with one another.

Moreover, in the present description, "line contact" refers to two or more metal nanowires being in contact for at least 1 μm.

<2> The transparent conductive film described in <1>, wherein the metal nanowires include metal nanowire bodies and a colored compound adsorbed onto the metal nanowire bodies, and the colored compound is a dye.

<3> The transparent conductive film described in <2>, wherein the colored compound is adsorbed in an amount of from 0.5 mass % to 10 mass % relative to the metal nanowire bodies.

<4> The transparent conductive film described in <2> or <3>, wherein the dye absorbs visible region light.

In the transparent conductive films described in <2> to <4>, as a result of the colored compound adsorbed onto the metal nanowire bodies absorbing light, and in particular visible light, diffuse reflection of light by the surfaces of the metal nanowire bodies can be even more efficiently prevented than in the transparent conductive film described in <1>. Moreover, diffuse reflection can be more reliably prevented as a result of the colored compound being adsorbed onto the surfaces of the metal nanowire bodies in the prescribed amount.

<5> The transparent conductive film described in <1>, wherein the metal nanowires include metal nanowire bodies and a colored compound adsorbed onto the metal nanowire bodies, and the colored compound includes a chromophore that absorbs visible region light and a group that bonds to a constituent metal of the metal nanowire bodies.

<6> The transparent conductive film described in <5>, wherein the colored compound is adsorbed in an amount of from 0.5 mass % to 10 mass % relative to the metal nanowire bodies.

In the transparent conductive films described in <5> and <6>, as a result of the colored compound adsorbed onto the metal nanowire bodies absorbing light, and in particular visible light, diffuse reflection of light by the surfaces of the metal nanowire bodies can be even more efficiently prevented than in the transparent conductive film described in <1>. Moreover, diffuse reflection can be more reliably prevented as a result of the colored compound being adsorbed onto the surfaces of the metal nanowire bodies in the prescribed amount.

<7> The transparent conductive film described in <5> or <6>, wherein the colored compound is represented by general formula (I) shown below $$R\text{—}X \qquad (I)$$

where R is a chromophore that absorbs visible region light and X is a group that bonds to a constituent metal of the metal nanowire bodies.

<8> The transparent conductive film described in any one of <5> to <7>, wherein the chromophore includes at least one selected from the group consisting of an unsaturated alkyl group, an aromatic ring, a heterocyclic ring, and a metal ion.

<9> The transparent conductive film described in any one of <5> to <8>, wherein the chromophore includes at least one selected from the group consisting of a nitroso group, a nitro group, an azo group, a methine group, an amino group, a ketone group, a thiazolyl group, a naphthoquinone group, an indoline group, a stilbene derivative, an indophenol derivative, a diphenylmethane derivative, an anthraquinone derivative, a triarylmethane derivative, a diazine derivative, an indigoid derivative, a xanthene derivative, an oxazine derivative, a phthalocyanine derivative, an acridine derivative, a thiazine derivative, a sulfur atom-containing compound, and a metal ion-containing compound.

<10> The transparent conductive film described in <9>, wherein the chromophore includes at least one selected from the group consisting of a Cr complex, a Cu complex, a Co complex, a Ni complex, an Fe complex, an azo group, and an indoline group.

<11> The conductive film described in any one of <5> to <10>, wherein the group that bonds to the constituent metal is either or both of a thiol group and a disulfide group.

<12> The transparent conductive film described in any one of <2> to <11>, wherein the metal nanowire bodies have an average minor axis diameter of from 1 nm to 500 nm and an average major axis length of from 5 μm to 50 μm.

<13> The transparent conductive film described in any one of <2> to <12>, wherein the metal nanowire bodies include, as a constituent, at least one element selected from the group consisting of Ag, Au, Ni, Cu, Pd, Pt, Rh, Ir, Ru, Os, Fe, Co, Sn, Al, Tl, Zn, Nb, Ti, In, W, Mo, Cr, V, and Ta.

<14> The transparent conductive film described in <13>, wherein a Δreflection L* value is no greater than 2.5.

Herein, "Δreflection L* value" refers to a number expressed by the following formula that can be measured in accordance with JIS Z8722.

ΔReflection $L^*$ value=(Reflection $L^*$ value of transparent electrode including substrate)−(Reflection $L^*$ value of substrate)

<15> The transparent conductive film described in <13> or <14>, further comprising a binder, wherein the metal nanowires are dispersed in the binder.

<16> The transparent conductive film described in any one of <13> to <15>, wherein the metal nanowires are accumulated on a substrate.

<17> A transparent conductive film production method for producing the transparent conductive film described in any one of <1> to <16> including subjecting a metal nanowire dispersion liquid to stream dispersion treatment and subsequently forming a transparent conductive film.

According to the transparent conductive film production method described in <17>, scattering of external light by a transparent conductive film can be inhibited, and black floating prevention (photopic contrast) and electrode pattern non-visibility can be improved because it is possible to ensure that the number of bundle structures in the transparent conductive film does not exceed a specific level.

<18> The transparent conductive film production method described in <17>, further including adsorption of a colored compound onto metal nanowire bodies prior to the stream dispersion treatment, the adsorption of the colored compound onto the metal nanowire bodies including: (1) placing, into a container containing the colored compound and a solvent in which the colored compound is dissolved or dispersed, a filter vessel that allows the colored compound and the solvent to pass and does not allow metal nanowires and aggregates of the colored compound to pass; (2) adding the metal nanowire bodies into the filter vessel to bring the metal nanowire bodies into contact with the colored compound dissolved or dispersed in the solvent; and (3) taking the filter vessel out of the container and removing, from the filter vessel, solvent and unattached colored compound in the solvent.

According to the transparent conductive film production method described in <18>, scattering of external light by the transparent conductive film can be inhibited more efficiently, and black floating prevention (photopic contrast) and electrode pattern non-visibility can be improved more efficiently as a result of the colored compound being adsorbed onto the metal nanowire bodies.

<19> An information input device including a transparent substrate and the transparent conductive film described in any one of <1> to <16> disposed on the transparent substrate.

In the information input device described in <19>, black floating due to diffuse reflection by an information input screen or the like and electrode visibility are prevented, and screen display visibility is improved.

<20> An electronic device including a display panel and the transparent conductive film described in any one of <1> to <16> disposed at a display surface-side of the display panel.

In the electronic device described in <20>, black floating due to diffuse reflection by a display screen or the like and electrode visibility are prevented, and screen display visibility is improved.

Advantageous Effect

The present disclosure can solve the various conventional problems described above and achieve the objectives described above, and can provide a transparent conductive film that efficiently inhibits scattering of external light at a display screen such as a touch panel, and improves black floating prevention (photopic contrast) and electrode pattern non-visibility, a method for producing the transparent conductive film, an information input device including the transparent conductive film, and an electronic device including the transparent conductive film.

Furthermore, according to the present disclosure, photopic contrast at a display surface of the information input device and the electronic device can be improved due to the transparent conductive film provided at the display screen exhibiting improved black floating prevention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. In the accompanying drawings:

FIGS. 8A, 8B, and 8C each schematically illustrate part of a metal nanowire bundle structure in a transparent conductive film according to the present disclosure;

DETAILED DESCRIPTION (Transparent Conductive Film)

Figure 5:
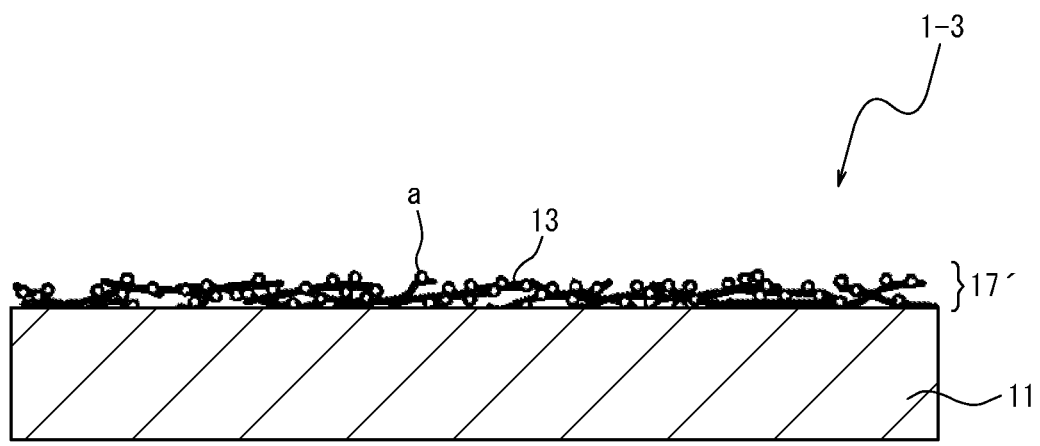
FIG. 5 is a cross-sectional schematic view illustrating an example of configuration (Modified Example 3) of a transparent electrode including a transparent conductive film according to the present disclosure.

A transparent conductive film according to the present disclosure at least includes one or more metal nanowires and may further include a binder (transparent resin material) and other components as required. The metal nanowires are preferably dispersed in the binder, but may alternatively be accumulated on a substrate as illustrated in FIG. 5 described further below.

<Metal Nanowires>

The metal nanowires include as least metal nanowire bodies and preferably further include a colored compound adsorbed onto the metal nanowire bodies and other components as required.

The number of bundle structures of the metal nanowires per each rectangular area region of 30 µm in height and 40 µm in width (30 µm×40 µm) of the transparent conductive film may be selected as appropriate depending on the objective, without any specific limitations other than being 3 or fewer. However, the aforementioned number of metal nanowire bundle structures is preferably 2 or fewer, more preferably 1 or fewer, and particularly preferably 0.

It is not possible to inhibit scattering of external light if the number of metal nanowire bundle structures exceeds 3. On the other hand, it is advantageous for the number of metal nanowire bundle structures to be in the preferable range, the more preferable range, or the particularly preferable range described above in terms of more effectively inhibiting scattering of external light.

A bundle structure is defined as a structure in which two or more metal nanowires are partially or completely in line contact with one another.

Moreover, in the present description, "line contact" refers to two or more metal nanowires being in contact for at least 1 µm.

FIGS. 8A, 8B, and 8C each schematically illustrate a portion of a metal nanowire bundle structure in a transparent conductive film according to the present disclosure.

FIG. 8A illustrates two metal nanowires 13 that are completely in line contact with one another.

FIG. 8B illustrates two metal nanowires 13 that are partially in line contact with one another.

FIG. 8C illustrates three metal nanowires 13 that are partially in line contact with one another.

<<Metal Nanowire Bodies>>

The metal nanowire bodies are fine wires made from metal that have nanometer-scale diameters.

A constituent element of the metal nanowire bodies may be selected as appropriate depending on the objective, without any specific limitations other than being a metal element, and may for example be Ag, Au, Ni, Cu, Pd, Pt, Rh, Ir, Ru, Os, Fe, Co, Sn, Al, Tl, Zn, Nb, Ti, In, W, Mo, Cr, V or Ta. Any one of these examples may be used alone or any two or more of these examples may be used in combination.

Among these examples, Ag and Au are preferable due to having high conductivity.

The average minor axis diameter of the metal nanowire bodies may be selected as appropriate depending on the objective, without any specific limitations, and is preferably from 1 nm to 500 nm, and more preferably from 10 nm to 100 nm.

Metal nanowire bodies having an average minor axis diameter of less than 1 nm have poor conductivity and a transparent conductive film including such metal nanowire bodies may not be able to function as a conductive film, whereas a transparent conductive film including metal nanowire bodies having an average minor axis diameter of greater than 500 nm has poor total light transmittivity and high haze. On the other hand, it is advantageous for the average minor axis diameter of the metal nanowire bodies to be in the more preferable range described above because a transparent conductive film including such metal nanowire bodies has high conductivity and high transparency.

The average major axis length of the metal nanowire bodies may be selected as appropriate depending on the objective, without any specific limitations, and is preferably from 5 μm to 50 μm.

When the average major axis length of the metal nanowire bodies is less than 5 μm, the metal nanowire bodies have a poor tendency to join to one another and a transparent conductive film including such metal nanowire bodies may not be able to function as a conductive film, whereas when the average major axis length is greater than 50 μm, a transparent conductive film including such metal nanowire bodies has poor total light transmittivity and the metal nanowire bodies have poor dispersibility when used to form the transparent conductive film.

Note that the average minor axis diameter and the average major axis length of the metal nanowire bodies are respectively a number average minor axis diameter and a number average major axis length that can be measured using a scanning electron microscope. More specifically, at least 100 of the metal nanowire bodies are measured and an image analyzer is used to calculate a projected diameter and a projected area of each nanowire from an electron microscope photograph. The projected diameter is taken to be the minor axis diameter. The major axis length is calculated based on the following formula.

Major axis length=Projected area/Projected diameter

The average minor axis diameter is the arithmetic mean of the minor axis diameters. The average major axis length is the arithmetic mean of the major axis lengths.

Furthermore, the metal nanowire bodies may alternatively have a wire shape connecting metal nanoparticles in a bead-string shape. No specific limitations are placed on the length in such a situation.

The mass per unit area of the metal nanowire bodies may be selected as appropriate depending on the objective, without any specific limitations, and is preferably from 0.001 g/m$^2$ to 1.000 g/m$^2$, and more preferably from 0.003 g/m$^2$ to 0.03 g/m$^2$.

When the mass per unit area of the metal nanowire bodies is less than 0.001 g/m$^2$, the transparent conductive film may have poor conductivity because the metal nanowire bodies are not sufficiently present in an adsorption wire layer, whereas when the mass per unit area is greater than 1.000 g/m$^2$, the transparent conductive film may have poor total light transmittivity and haze. On the hand, it is advantageous for the mass per unit area of the metal nanowire bodies to be in the more preferable range described above because the transparent conductive film has high conductivity and high transparency in such a situation.

<<Colored Compound>>

The colored compound is a substance that absorbs visible region light and is adsorbed onto the metal nanowire bodies. In the present description, "visible region light" refers to a wavelength band from approximately 360 nm or greater to 830 nm or less. The colored compound is (i) a dye or (ii) a compound including a chromophore that absorbs visible region light and a group that bonds to the constituent metal of the metal nanowire bodies (i.e., a compound represented by a general formula [R—X], where R is a chromophore that absorbs visible region light and a X is a functional group (part) that bonds to the constituent metal of the metal nanowire bodies).

The amount of the colored compound that is adsorbed relative to the metal nanowire bodies may be selected as appropriate depending on the objective, without any specific limitations, and is preferably from 0.5 mass % to 10 mass %.

When the adsorbed amount of the colored compound relative to the metal nanowire bodies is less than 0.5 mass %, the effect of inhibiting scattering of external light may be small and electrode pattern non-visibility may be poor, whereas when the adsorbed amount is greater than 10 mass %, the adsorbed colored compound may inhibit contact between the metal nanowires and may adversely affect conductivity.

—Dye—

The dye may be selected as appropriate depending on the objective, without any specific limitations, and may for example be an acidic dye or a direct dye.

Specific examples of dyes that may be selected as appropriate depending on the objective, without any specific limitations, include sulfo group-containing dyes such as Kayakalan Bordeaux BL, Kayakalan Brown GL, Kayakalan Gray BL167, Kayakalan Yellow GL143, Kayakalan Black 2RL, Kayakalan Black BGL, Kayakalan Orange RL, Kayarus Cupro Green G, Kayarus Supra Blue MRG, and Kayarus Supra Scarlet BNL200 produced by Nippon Kayaku Co., Ltd., Lanyl Olive BG produced by Taoka Chemical Co., Ltd., and Kayalon Polyester Blue 2R-SF, Kayalon Microester Red AQ-LE, Kayalon Polyester Black ECX300, and Kayalon Microester Blue AQ-LE produced by Nippon Kayaku Co., Ltd.; dyes containing a carboxyl group in a Ru complex (pigments for dye-sensitized solar cells) such as N3, N621, N712, N719, N749, N773, N790, N820, N823, N845, N886, N945, K9, K19, K23, K27, K29, K51, K60, K66, K69, K73, K77, Z235, Z316, Z907, Z907Na, Z910, Z991, CYC-B1, and HRS-1; and dyes containing a carboxyl group in an organic pigment (pigments for dye-sensitized solar cells) such as Anthocyanine, WMC234, WMC236, WMC239, WMC273, PPDCA, PTCA, BBAPDC, NKX-2311, NKX-2510, NKX-2553 (produced by Hayashibara Co., Ltd.), NKX-2554 (produced by Hayashibara Co., Ltd.), NKX-2569, NKX-2586, NKX-2587 (produced by Hayashibara Co., Ltd.), NKX-2677 (produced by Hayashibara Co., Ltd.), NKX-2697, NKX-2753, NKX-2883, NK-5958 (produced by Hayashibara Co., Ltd.), NK-2684 (produced by Hayashibara Co., Ltd.), Eosin Y, Mercurochrome, MK-2 (produced by Soken Chemical & Engineering Co., Ltd.), D77, D102 (produced by Mitsubishi Paper Mills, Ltd.), D120, D131 (produced by Mitsubishi Paper Mills, Ltd.), D149 (produced by Mitsubishi Paper Mills, Ltd.), D150, D190, D205 (produced by Mitsubishi Paper Mills, Ltd.), D358 (produced by Mitsubishi Paper Mills, Ltd.), JK-1, JK-2, 5, ZnTPP, H2TC1PP, H2TC4PP, Phthalocyanine Dye (zinc phthalocyanine-2,9,16,23-tetra-carboxylic acid), 2-[2'-(zinc9',16',23'-tri-tert-butyl-29H,31H-phthalocyanyl)] succinic acid, Polythiohene Dye (TT-1), Pendant type polymer, and Cyanine Dye (P3TTA, C1-D, SQ-3, B1).

—Chromophore [R]—

The chromophore [R] may be selected as appropriate depending on the objective, without any specific limitations other than absorbing visible region light, and may for example be an unsaturated alkyl group, an aromatic ring, a heterocyclic ring, or a metal ion. Any one of these examples may be used alone or any two or more of these examples may be used in combination.

Among these examples, an aromatic ring or a heterocyclic ring, and in particular cyanine, quinone, ferrocene, triphenylmethane, or quinoline, is preferable in terms of enabling production of a transparent conductive film having improved transparency.

Specific examples of the chromophore [R] that may be selected as appropriate depending on the objective, without any specific limitations, include a nitroso group, a nitro group, an azo group, a methine group, an amino group, a ketone group, a thiazolyl group, a naphthoquinone group, an indoline group, a stilbene derivative, an indophenol derivative, a diphenylmethane derivative, an anthraquinone derivative, a triarylmethane derivative, a diazine derivative, an indigoid derivative, a xanthene derivative, an oxazine derivative, a phthalocyanine derivative, an acridine derivative, a thiazine derivative, a sulfur atom-containing compound, and a metal ion-containing compound. Any one of these examples may be used alone or any two or more of these examples may be used in combination.

Among these examples, a Cr complex, a Cu complex, a Co complex, a Ni complex, an Fe complex, an azo group, or an indoline group is preferable in terms of enabling production of a transparent conductive film having improved transparency.

—Functional group [X]—

The functional group [X] is a group that bonds to the metal nanowire bodies constituting the metal nanowires. Specific examples of the functional group [X] that may be selected as appropriate depending on the objective, without any specific limitations, include a sulfo group (inclusive of sulfonic acid salts), a sulfonyl group, a sulfonamide group, a carboxylic acid group (inclusive of carboxylic acid salts), an amino group, an amide group, a phosphate group (inclusive of phosphoric acid salts and phosphoric acid esters), a phosphino group, a silanol group, an epoxy group, an isocyanate group, a cyano group, a vinyl group, a thiol group, a disulfide group, a carbinol group, a hydroxy group, or an atom (for example, N (nitrogen), S (sulfur), or O (oxygen)) that can coordinate to the constituent metal of the metal nanowires. Any one of these examples be used alone or any two or more of these examples may be used in combination. At least one functional group [X] is present in the colored compound.

Among these examples, a thiol group or a disulfide group is preferable in terms of limiting conductivity reduction due to adsorption of the colored compound.

For each constituent metal of the metal nanowire bodies, a compound that can be adsorbed onto the metal is selected from among compounds represented by the general formula [R—X] described above.

A self-organizing material may be used as the colored compound including the functional group [X]. Furthermore, the functional group [X] may constitute part of the chromophore [R]. Note that regardless of whether or not a colored compound includes a functional group [X], a functional group [X] can be added through a chemical reaction between a compound including a chromophore [R] and a compound including a functional group [X].

<<Other Components>>

Other components may be selected as appropriate depending on the objective, without any specific limitations, and may for example include a dispersant adsorbed onto the metal nanowire bodies; and an additive for improving durability and close adherence of the metal nanowire bodies to one another and to a transparent substrate.

The dispersant may be selected as appropriate depending on the objective, without any specific limitations, and may for example be an amino group-containing compound such as polyvinyl pyrrolidone (PVP) or polyethyleneimine; or a compound that can be adsorbed onto metal and includes a functional group such as a sulfo group (inclusive of sulfonic acid salts), a sulfonyl group, a sulfonamide group, a carboxylic acid group (inclusive of carboxylic acid salts), an amide group, a phosphate group (inclusive of phosphoric acid salts and phosphoric acid esters), a phosphino group, a silanol group, an epoxy group, an isocyanate group, a cyano group, a vinyl group, a thiol group, or a carbinol group.

Adsorption of the dispersant onto the metal nanowire bodies improves dispersibility of the metal nanowire bodies.

The dispersant is caused to adhere to the metal nanowire bodies in an amount that does not adversely affect conductivity of the transparent conductive film described further below or impair adsorption of the colored compound.

<Binder (Transparent Resin Material)>

The binder (transparent resin material) enables dispersion of the metal nanowires and may be selected from a wide range of known transparent natural polymer resins and synthetic polymer resins.

The binder (transparent resin material) may be selected as appropriate depending on the objective, without any specific limitations, and may for example be a thermoplastic resin, a thermosetting resin, or a positive-type or negative-type photosensitive resin.

<<Thermoplastic Resin>>

The thermoplastic resin may be selected as appropriate depending on the objective, without any specific limitations, and may for example be polyvinyl chloride, a vinyl chloride-vinyl acetate copolymer, polymethyl methacrylate, nitrocellulose, chlorinated polyethylene, chlorinated polypropylene, vinylidene fluoride, ethylcellulose, hydroxypropyl methylcellulose, polyvinyl alcohol, or polyvinyl pyrrolidone.

<<Thermosetting Resin>>

The thermosetting resin may be selected as appropriate depending on the objective, without any specific limitations, and may for example be a composition including (i) a polymer such as polyvinyl alcohol, a polyvinyl acetate-based polymer (for example, saponified polyvinyl acetate), a polyoxyalkylene-based polymer (for example, polyethylene glycol or polypropylene glycol), or a cellulosic polymer (for example, methylcellulose, viscose, hydroxyethyl cellulose, hydroxyethyl methylcellulose, carboxymethyl cellulose, or hydroxypropyl methylcellulose) and (ii) a cross-linking agent such as a metal alkoxide, a diisocyanate compound, or a blocked isocyanate compound.

<<Positive-Type Photosensitive Resin>>

The positive-type photosensitive resin may be selected as appropriate depending on the objective, without any specific limitations, and may for example be a commonly known positive-type photoresist material such as a composition including (i) a polymer such as a novolac resin, an acrylic copolymer resin, or a hydroxypolyamide and (ii) a naphthoquinonediazide compound.

<<Negative-Type Photosensitive Resin>>

The negative-type photosensitive resin may be selected as appropriate depending on the objective, without any specific limitations, and may for example be (i) a polymer having a photosensitive group introduced onto either or both of a main chain and a side chain thereof, (ii) a composition including a binder resin (polymer) and a cross-linking agent, or (iii) a composition including a photopolymerization initiator and either or both of a (meth)acrylic monomer and a (meth)acrylic oligomer.

—(i) Polymer Having a Photosensitive Group Introduced onto Either or Both of a Main Chain and a Side Chain Thereof—

The photosensitive group may be selected as appropriate depending on the objective, without any specific limitations, and may for example be a nitrogen atom-containing functional group, a sulfur atom-containing functional group, a bromine atom-containing functional group, a chlorine atom-containing functional group, or a functional group not containing any of the aforementioned atoms.

Specific examples of the photosensitive group that may be selected as appropriate depending on the objective, without any specific limitations, include functional groups including an azide group, a diazirine group, a stilbene group, a chalcone group, a diazonium salt group, a cinnamic acid group, or an acrylic acid group.

Among these examples, an azide group or a diazirine group is preferable.

The polymer having the photosensitive group introduced onto either or both of a main chain and a side chain thereof preferably does not impair dispersibility of the metal nanowires and is preferably water-soluble. "Water-soluble" in this case refers to a compound that has a sufficient amount of ionic or polar side chains relative to a main chain in molecules thereof in order to dissolve in water.

The solubility in water (number of grams that dissolve in 100 g of water) of the polymer having the photosensitive group introduced onto either or both of a main chain and a side chain thereof may be selected as appropriate depending on the objective, without any specific limitations, and is preferably at least 1 at 25° C.

The polymer having the photosensitive group introduced onto either or both of a main chain and a side chain thereof may be selected as appropriate depending on the objective, without any specific limitations, and may for example be polyvinyl alcohol, polyvinyl butyral, polyvinyl pyrrolidone, polyvinyl acetamide, polyvinyl formamide, polyvinyl oxazolidone, polyvinyl succinimide, polyacrylamide, polymethacrylamide, polyethylenimine, a polyvinyl acetate-based polymer (for example, saponified polyvinyl acetate), a polyoxyalkylene-based polymer (for example, polyethylene glycol or polypropylene glycol), a cellulosic polymer (for example, methylcellulose, viscose, hydroxyethyl cellulose, hydroxyethyl methylcellulose, carboxymethyl cellulose, or hydroxypropyl methylcellulose), a natural polymer (for example, gelatin, casein, collagen, gum arabic, xanthan gum, gum tragacanth, guar gum, pullulan, pectin, sodium alginate, hyaluronic acid, chitosan, a chitin derivative, carrageenan, a starch (for example, carboxymethyl starch or aldehyde starch), a dextrin, or a cyclodextrin), or a copolymer of constituent monomers of any of the preceding examples. Any one of these examples may be used alone or any two or more of these examples may be used in combination.

Among these examples, a polymer represented by general formula (I) shown below is preferable. As a result, ink forming is possible without impairing dispersibility of the metal nanowires. Furthermore, a homogenous film can be applied onto a substrate and a transparent conductive film and a transparent conductive film of a specific pattern can be formed through a practical wavelength of from 300 nm to 500 nm.

[CHEM. 1]

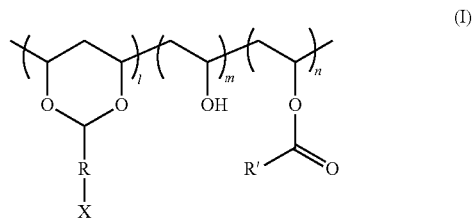

(I)

In general formula (I), X is at least one type of photosensitive group including an azide group, R is a chain or cyclic alkylene group that may include one or more of an unsaturated bond, an ether bond, a carbonyl bond, an ester bond, an amide bond, a urethane bond, a sulfide bond, an aromatic ring, a heterocyclic ring, an amino group, or a quaternary ammonium salt group on either or both of a main chain and a side chain thereof, R' is a chain or cyclic alkyl group that may include one or more of an unsaturated bond, an ether bond, a carbonyl bond, an ester bond, an amide bond, a urethane bond, a sulfide bond, an aromatic ring, a heterocyclic ring, an amino group, or a quaternary ammonium salt group on either or both of a main chain and a side chain thereof, l and m are each 1 or greater, and n is 0 or greater.

—(ii) Composition Including a Binder Resin (Polymer) and a Cross-Linking Agent—

The binder resin (polymer) preferably does not impair dispersibility of the metal nanowires and is preferably a water-soluble polymer. "Water-soluble" in this case refers to a polymer that has a sufficient amount of ionic or polar side chains relative to a main chain in molecules thereof in order to dissolve in water.

The solubility in water (number of grams that dissolve in 100 g of water) of the water-soluble polymer may be selected as appropriate depending on the objective, without any specific limitations, and is preferably at least 1 at 25° C.

The water-soluble polymer may be selected as appropriate depending on the objective, without any specific limitations, and may for example be polyvinyl alcohol, polyvinyl butyral, polyvinyl pyrrolidone, polyvinyl acetamide, polyvinyl formamide, polyvinyl oxazolidone, polyvinyl succinimide, polyacrylamide, polymethacrylamide, polyethylenimine, a polyvinyl acetate-based polymer (for example, saponified polyvinyl acetate), a polyoxyalkylene-based polymer (for example, polyethylene glycol or polypropylene glycol), a cellulosic polymer (for example, methylcellulose, viscose, hydroxyethyl cellulose, hydroxyethyl methylcellulose, carboxymethyl cellulose, or hydroxypropyl methylcellulose), a natural polymer (for example, gelatin, casein, collagen, gum arabic, xanthan gum, gum tragacanth, guar gum, pullulan, pectin, sodium alginate, hyaluronic acid, chitosan, a chitin derivative, carrageenan, a starch (for example, carboxymethyl starch or aldehyde starch), a dextrin, or a cyclodextrin), or a copolymer of constituent monomers of any of the preceding examples. Any one of these examples may be used alone or any two or more of these examples may be used in combination.

The cross-linking agent preferably does not impair dispersibility of the metal nanowires and is preferably water-soluble. In the case of the cross-linking agent, water-soluble means that an aqueous solution of at least 0.1 mM in concentration can be obtained.

The cross-linking agent may be selected as appropriate depending on the objective, without any specific limitations, and may for example be a bisazide compound, an aromatic bisazide compound, a polyfunctional azide compound, an aromatic polyfunctional azide compound, a diazirine compound, an aromatic diazirine compound, hexamethoxy methylmelamine, or tetramethoxy glycoluril. Any one of these examples may be used alone or any two or more of these examples may be used in combination.

Among these examples, a bisazide compound, an aromatic bisazide compound, a polyfunctional azide compound, an aromatic polyfunctional azide compound, a diazirine compound, or an aromatic diazirine compound is preferable.

—(iii) Composition Including a Photopolymerization Initiator and Either or Both of a (Meth)Acrylic Monomer and a (Meth)Acrylic Oligomer—

A composition including a photopolymerization initiator and either or both of a (meth)acrylic monomer and a (meth)acrylic oligomer may be used as the photosensitive material. The composition including the photopolymerization initiator and either or both of the (meth)acrylic monomer and the (meth)acrylic oligomer preferably does not impair dispersibility of the metal nanowires and is preferably water-soluble.

The solubility in water (number of grams that dissolve in 100 g of water) of the composition including the photopolymerization initiator and either or both of the (meth)acrylic monomer and the (meth)acrylic oligomer may be selected as appropriate depending on the objective, without any specific limitations, and is preferably at least 1 at 25° C.

Specific examples of negative-type photosensitive materials among the photosensitive materials described above that may be selected as appropriate depending on the objective, without any specific limitations, include a polyvinyl alcohol including a photosensitive group azide and an aqueous UV polymer (for example, O-106 and O-391 produced by Chukyo Yushi Co., Ltd.).

The chemical reaction of the negative-type photosensitive material may be selected as appropriate depending on the objective, without any specific limitations, and may for example be (i) photopolymerization through a photopolymerization initiator, (ii) photodimerization of stilbene, maleimide, or the like, or (iii) crosslinking through photolysis of an azide group, a diazirine group, or the like.

Among these examples, (iii) cross-linking through photolysis of an azide group, a diazirine group, or the like is preferable in terms of curing reactivity as the reaction is not inhibited by oxygen and the resultant cured film has excellent solvent resistance, hardness, and scratch resistance.

A surfactant, a viscosity modifier, a dispersant, a curing accelerator catalyst, a plasticizer, or a stabilizer such as an antioxidant or a sulfurization inhibitor may be added to the binder as an additive as required.

<ΔReflection L* Value>

The Δreflection L* value represents the difference between reflection L* values of an electrode portion and a non-electrode portion of a transparent electrode described further below. In general, as the Δreflection L* value decreases, the difference in scattering of external light between the electrode portion and the non-electrode portion of the transparent electrode decreases such that electrode pattern visibility can be restricted. Photopic contrast of a display element is improved if a touch panel mounted therein uses a transparent electrode that has little scattering of external light by an electrode portion. Also, screen visibility of a mobile device during outdoor use can be improved and electricity consumption can be reduced.

The Δreflection L* value of the transparent conductive film may be selected as appropriate depending on the objective, without any specific limitations, and is preferably no greater than 2.5, more preferably no greater than 2.2, further preferably no greater than 1.5, and particularly preferably no greater than 1.0.

When the Δreflection L* value of the transparent conductive film is greater than 2.5, electrode pattern non-visibility is adversely affected, photopic contrast is reduced, and the black floating phenomenon occurs, which makes the transparent conductive film unsuitable for use at the display surface-side of a display panel. On the other hand, it is advantageous for the Δreflection L* value of the transparent conductive film to be in the more preferable range, the further preferable range, or the particularly preferable range described above in terms of suppressing the black floating phenomenon and making the transparent conductive film suitable for use at the display surface-side of a display panel.

The Δreflection L* value can be evaluated in accordance with JIS Z8722 and is represented by the following formula.

$$\Delta \text{Reflection } L^* \text{ value} = (\text{Reflection } L^* \text{ value of transparent electrode including substrate}) - (\text{Reflection } L^* \text{ value of substrate})$$

(Transparent Conductive Film Production Method)

A method for producing the transparent conductive film according to the present disclosure includes a process of subjecting a metal nanowire dispersion liquid to stream dispersion treatment and subsequently forming a transparent conductive film, and may further include a process of preparing metal nanowires, a process of preparing a dispersion liquid for transparent conductive film production, and other processes as required.

In a situation in which a colored compound is adsorbed onto metal nanowire bodies, the colored compound is preferably present only on the surfaces of the metal nanowire bodies without detachment or the like thereof occurring in the transparent conductive film. Therefore, in a situation in which a transparent conductive film is to be produced in which a colored compound is adsorbed onto metal nanowire bodies, a method is used in which metal nanowires formed from the metal nanowire bodies having the colored compound adsorbed thereon are prepared in advance, metal nanowires from which unattached colored compound has been removed are used to prepare a metal nanowire dispersion liquid, and the metal nanowire dispersion liquid is subjected to stream dispersion treatment.

<Metal Nanowire Dispersion Liquid>

The metal nanowire dispersion liquid at least includes the previously described metal nanowires and a dispersion liquid medium, and may further include the previously described binder (transparent resin material), a dispersant for improving dispersibility of the metal nanowires, an additive for improving close adherence or durability, and other components as required.

<<Dispersion Liquid Solvent>>

The dispersion liquid solvent may be selected as appropriate depending on the objective, without any specific limitations other than being a solvent in which the metal nanowires can be dispersed, and may for example be water; an alcohol such as methanol, ethanol, n-propanol, i-propanol, n-butanol, sec-butanol, or tert-butanol; a ketone such as cyclohexanone or cyclopentanone; an amide such as N,N-dimethylformamide (DMF); or a sulfide such as dimethyl sulfoxide (DMSO). Any one of these examples may be used alone or any two or more of these examples may be used in combination.

In order to inhibit uneven drying, cracks, and whitening of a transparent conductive film formed using the metal nanowire dispersion liquid, a high-boiling point solvent may be added to the dispersion liquid solvent in order to control the rate of solvent evaporation from the dispersion liquid.

The high-boiling point solvent may be selected as appropriate depending on the objective, without any specific limitations, and may for example be butyl cellosolve, diacetone alcohol, butyl triglycol, propylene glycol monomethyl ether, propylene glycol monoethyl ether, ethylene glycol monoethyl ether, ethylene glycol monopropyl ether, ethylene glycol monoisopropyl ether, diethylene glycol monobutyl ether, diethylene glycol monoethyl ether, diethylene glycol monomethyl ether, diethylene glycol diethyl ether, dipropylene glycol monomethyl ether, tripropylene glycol monomethyl ether, propylene glycol monobutyl ether, propylene glycol isopropyl ether, dipropylene glycol isopropyl ether, tripropylene glycol isopropyl ether, and methyl glycol. Any one of these examples may be used alone or any two or more of these examples may be used in combination.

<<Other Components>>

The other components may be selected as appropriate depending on the objective, without any specific limitations, and may for example include a light stabilizer, an ultraviolet absorber, a light absorber, an antistatic agent, a lubricant, a leveling agent, a defoamer, a flame retardant, an infrared absorber, a surfactant, a viscosity modifier, a dispersant, a curing accelerator catalyst, a plasticizer, an antioxidant, or a sulfurization inhibitor. Any one of these examples may be used alone or any two or more of these examples may be used in combination.

In a situation in which the dispersant is added, the additive amount is preferably of a level that does not adversely affect conductivity of the finally obtained transparent conductive film.

The blended amount of the metal nanowires in the metal nanowire dispersion liquid may be selected as appropriate depending on the objective, without any specific limitations, and is preferably from 0.01 parts by mass to 10 parts by mass relative to 100 parts by mass of the metal nanowire dispersion liquid.

When the blended amount of the metal nanowires in the metal nanowire dispersion liquid is less than 0.01 parts by mass, the metal nanowires cannot be provided with a sufficient mass per unit area (from 0.001 $g/m^2$ to 1.000 $g/m^2$) in the finally obtained transparent conductive film, whereas when the blended amount is greater than 10 parts by mass, dispersibility of the metal nanowires deteriorates dramatically.

<Metal Nanowire Preparation Process>

The process of preparing the metal nanowires may be selected as appropriate depending on the objective, without any specific limitations, and may for example be a process in which a colored compound is adsorbed onto metal nanowire bodies. The process in which the colored compound is adsorbed onto the metal nanowire bodies can for example be appropriately carried out by a filter paper tube method.

<<Filter Paper Tube Method>>

The filter paper tube method includes at least (1) placing, into a container containing the colored compound and a solvent in which the colored compound is dissolved or dispersed, a filter vessel that allows the colored compound and the solvent to pass and does not allow metal nanowires and aggregates of the colored compound to pass, (2) adding the metal nanowire bodies into the filter vessel to bring the metal nanowire bodies into contact with the colored compound dissolved or dispersed in the solvent, and (3) taking the filter vessel out of the container and removing, from the filter vessel, solvent and unattached colored compound in the solvent, and may further include other processes as required.

First, only a solvent is added into the inside of a filter paper tube (filter) or order to sufficiently dampen the filter paper tube. Herein, the filter paper that is used allows the solvent and molecules of the colored compound to pass, but does not allow the metal nanowire bodies and aggregates of molecules of the colored compound to pass.

A material of the filter paper tube may be selected as appropriate depending on the objective, without any specific limitations, and may for example be fluorine fiber filter paper, cellulose fiber paper, glass fiber paper, or silica fiber paper. Among these examples, fluorine fiber filter paper is preferable in terms of shape retention in a solvent.

Although tube-shaped filter paper (filter paper tube) is used as a filter in this example, the shape of the filter may be selected as appropriate depending on the objective, without any specific limitations other than being a shape that can accommodate the solvent in which the metal nanowires are dispersed. Note that the present description refers to the method used in the present disclosure as the "filter paper tube method" in order to make it easier to distinguish between this method and methods involving adsorption of a colored compound onto metal nanowires by conventional techniques.

The solvent referred to above is a solvent other than water that can dissolve the colored compound.

The solvent may be selected as appropriate depending on the objective, without any specific limitations other than allowing dissolution of a specific concentration of the colored compound, and may for example be acetonitrile, 3-methoxypropionitrile, 3,3-dimethoxypropionitrile, ethoxypropionitrile, 3-ethoxypropionitrile, 3,3-oxydipropionitrile, 3-aminopropionitrile, propionitrile, propyl cyanoacetate, 3-methoxypropyl isothiocyanate, 3-phenoxypropionitrile, p-anisidine 3-(phenylmethoxy)propanenitrile, methanol, ethanol, propanol, isopropyl alcohol, n-butanol, 2-butanol, isobutanol, t-butanol, ethylene glycol, triethylene glycol, 1-methoxyethanol, 1,1-dimethyl-2-methoxyethanol, 3-methoxy-1-propanol, dimethyl sulfoxide, benzene, toluene, o-xylene, m-xylene, p-xylene, chlorobenzene, dichlorobenzene, butyl acetate, ethyl acetate, cyclohexane, cyclohexanone, ethyl methyl ketone, acetone, or dimethylformamide. Any one of these examples may be used alone or any two or more of these examples may be used in combination.

The solvent enables dispersion and/or dissolution of a certain concentration of the colored compound and is preferably an appropriately selected material that is compatible with the metal nanowire dispersion liquid.

A colored compound solution is added into a container that is larger than the filter paper tube, and the filter paper tube, without the solvent inside, but before drying out, is immersed in the colored compound solution with an opening thereof at the top and a bottom surface thereof at the bottom. Upon being immersed, the filter paper tube is preferably held still until some of the colored compound solution external thereto has filtered into the filter paper tube.

The colored compound solution is prepared by dissolving the colored compound in the solvent.

The concentration of the colored compound in the colored compound solution may be selected as appropriate depending on the type of colored compound, without any specific limitations, and is preferably from 0.01 mass % to 10.0 mass %, and more preferably from 0.1 mass % to 1.0 mass %.

A concentration of from 0.1 mass % to 1.0 mass % of the colored compound in the colored compound solution enables efficient adsorption of the colored compound onto the metal nanowire bodies and inhibits aggregation of colored compound molecules in the colored compound solution.

In preparation of the colored compound solution, either or both of a thiol and a disulfide may be mixed in.

Metal nanowire bodies dispersed in a first liquid medium (metal nanowire body dispersion liquid) are added into the inside of the filter paper tube and are left for a specific length of time (adsorption process).

The first liquid medium in which the metal nanowire bodies are dispersed may be selected as appropriate depending on the objective, without any specific limitations, and may for example be water or a solvent that can be used as the aforementioned solvent. Any one of these examples may be used alone or any two or more of these examples may be used in combination.

The amount of the metal nanowire bodies dispersed in the first liquid medium may be selected as appropriate depending on the objective, without any specific limitations, and is preferably from 0.1 mass % to 2.0 mass %, and more preferably from 0.2 mass % to 1.0 mass % relative to the metal nanowire body dispersion liquid. Dispersing the metal nanowire bodies in an amount of from 0.1% to 2.0% enables efficient adsorption of the colored compound and inhibits aggregation or the like of the metal nanowire bodies.

The adsorption temperature during adsorption of the colored compound onto the metal nanowire bodies may be selected as appropriate depending on the objective, without any specific limitations other than being a temperature at which the solvent and the first liquid medium do not boil, and is preferably from 25° C. to 100° C., and more preferably from 40° C. to 80° C.

The adsorption time during adsorption of the colored compound onto the metal nanowire bodies may be selected as appropriate depending on the objective, without any specific limitations, and is preferably from 1 hour to 120 hours, and more preferably from 1 hour to 12 hours.

Once the adsorption process is completed, the filter paper tube is taken out of the container and is held at room temperature while maintaining the tube shape thereof such that liquid inside the filter paper tube is filtered out of the bottom of the filter paper tube. During the above, complete drying up of the liquid is not allowed to occur. Once the majority of the liquid has been filtered out of the filter paper tube, the aforementioned solvent is added into the inside of the filter paper tube and liquid is once again filtered out through the bottom of the filter paper tube. This operation is preferably repeated until the filtrate is colorless and transparent. Note that in the process described above, an additive such as a dispersant, a surfactant, a defoamer, or a viscosity modifier may be added to the solvent as required.

Next, a second liquid medium is added into the filter paper tube and liquid inside the filter paper tube is filtered out as a filtrate (washing process).

The second liquid medium may be selected as appropriate depending on the objective, without any specific limitations, and may for example be water or a solvent that can be used as the aforementioned solvent. Any one of these examples may be used alone or any two or more of these examples may be used in combination. Among these examples, those having higher polarity than the aforementioned solvent are preferable.

The first liquid medium and the second liquid medium may be the same or different. The first liquid medium and the second liquid medium are preferably both pure water.

Once the solvent inside the filter paper tube has been replaced by the second liquid medium and the amount of liquid inside the filter paper tube has reached approximately the same amount as the initial metal nanowire body dispersion liquid, metal nanowires formed by the metal nanowire bodies and the colored compound adsorbed thereon that are attached to the inside of the walls of the filter paper tube are washed off using a plastic dropper or the like in order to collect the metal nanowires formed by the metal nanowire bodies and the colored compound adsorbed thereon.

In the filter paper tube method, the metal nanowire bodies do not come into contact with colored compound aggregates that are more likely to subsequently detach from the metal nanowire bodies, and unattached colored compound is removed by the washing process. Accordingly, metal nanowires (metal nanowire bodies having the colored compound adsorbed thereon) can be obtained that have a low tendency to generate unattached colored compound. Note that the filter paper tube method is merely one example of a process for preparing the metal nanowires in the transparent conductive film production method according to the present disclosure. Furthermore, the material and shape of the filter that is used, the solvent that is used, temperature and time conditions at each stage, and so forth may be adjusted as appropriate.

<<Evaluation of Adsorbed Amount of Colored Compound on Metal Nanowire Bodies>>

The adsorbed amount of the colored compound on the metal nanowires that are obtained through the metal nanowire preparation process described above and that are used for preparing a transparent conductive film described further below is from 0.5 mass % to 10 mass % relative to the metal nanowire bodies.

If the adsorbed amount of the colored compound is less than 0.5 mass %, the effect of reducing diffuse reflection of light by the metal nanowires cannot be sufficiently obtained.

On the other hand, if the adsorbed amount is greater than 10 mass %, problems may arise such as greater tendency of conductivity of the formed transparent conductive film to decrease and decreased dispersibility of the metal nanowires.

The adsorbed amount of the colored compound on the metal nanowires used to prepare the transparent conductive film and the dispersion liquid is evaluated through the analysis described below.

—STEM EDS Analysis—

The mass of the colored compound relative to the mass of the metal nanowire bodies can be measured or calculated through STEM EDS analysis of the metal nanowires. This analysis can for example be implemented by combining EDS measurement using an EM-002B produced by Topcon Technohouse Corporation and a system6 produced by Thermo Fisher Scientific K.K., ICP elemental analysis, transmission electron microscope (TEM) observation, and so forth.

The adsorbed amount of the colored compound on the metal nanowire bodies can be analyzed and calculated by the following method.

In the method, EDS measurement is used to measure the mass percentage of the constituent element of the metal nanowires and a characteristic element in the colored compound, and a ratio of the mass of metal and the mass of the colored compound is then calculated.

Through the above method, the amount of the colored compound that has been adsorbed onto the metal nanowire bodies can be confirmed.

<Dispersibility of Metal Nanowires>

The method by which dispersibility of the metal nanowires in the metal nanowire dispersion liquid is increased may be selected as appropriate depending on the objective, without any specific limitations, and may for example be stirring, ultrasonic dispersion, bead dispersion, mixing, homogenizer treatment, or stream dispersion treatment. Any one of these examples may be used alone or any two or more of these examples may be used in combination. Among these examples, stream dispersion treatment is suitable for improving dispersibility without damaging the metal nanowires.

<<Stream Dispersion Treatment>>

The stream dispersion treatment is a method that involves forcing the dispersion liquid through a fine flow channel under pressure using a plunger pump or the like such that the dispersion target is dispersed in the dispersion medium due to turbulence and shear force in the flow channel. The dispersion treatment conditions are mainly determined by the discharge rate and the discharge pressure of the pump, the diameter and the length of the flow channel, and the number of treatment repetitions. The number of repetitions of the dispersion treatment may be increased in a situation in which a single repetition of the dispersion treatment is insufficient. Furthermore, the dispersion liquid may be treated by being circulated continuously for a specific length of time.

<Transparent Conductive Film Formation>

Figure 1:
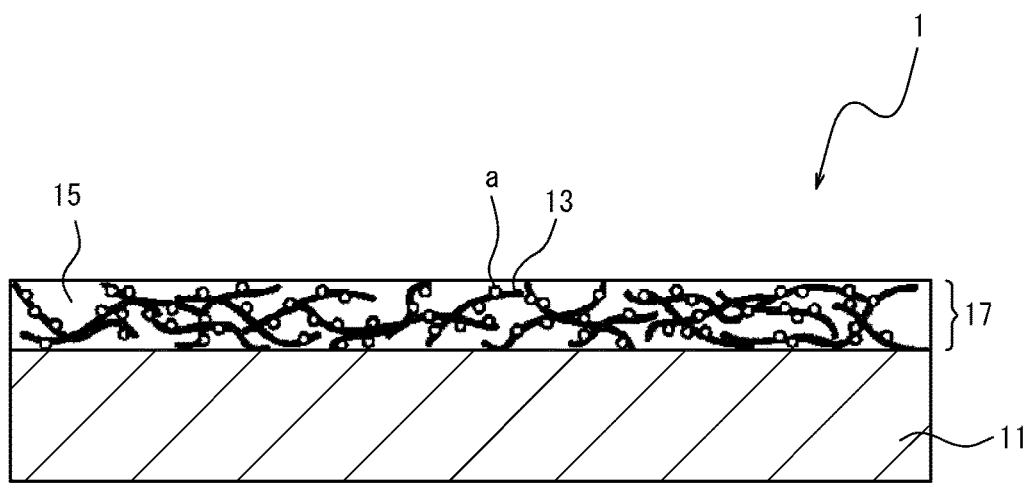
FIG. 1 is a cross-sectional schematic view illustrating an example of configuration (first embodiment) of a transparent electrode including a transparent conductive film according to the present disclosure, wherein colored compound a is present in a situation in which a colored compound has been adsorbed onto metal nanowires.

The following describes formation of a transparent conductive film (for example, a transparent conductive film 17 in a transparent electrode according to a first embodiment illustrated in FIG. 1).

The transparent conductive film is formed on a transparent substrate through processes such as dispersion film formation, dispersion film drying and curing, and the like described further below. A transparent electrode is prepared by subjecting the transparent substrate on which the transparent conductive film is formed to processes such as patterning (pattern etching) and calendering, described further below, as required.

<<Transparent Substrate>>

A material of the transparent substrate may be selected as appropriate depending on the objective, without any specific limitations other than being a material that transmits visible light, and may for example be an inorganic material or a plastic material.

The thickness of the transparent substrate may be selected as appropriate depending on the objective, without any specific limitations other than being a thickness required for a transparent electrode (for example, a thickness that allows a film shape (sheet shape) that is thin enough to exhibit flexible bending or a thickness that enables an appropriate degree of both flexibility and rigidity).

—Inorganic Material—

The inorganic material may be selected as appropriate depending on the objective, without any specific limitations, and may for example be quartz, sapphire, or glass.

—Plastic Material—

The plastic material may be selected as appropriate depending on the objective, without any specific limitations, and may for example be triacetyl cellulose (TAC), polyester (TPEE), polyethylene terephthalate (PET), polyethylene naphthalate (PEN), polyimide (PI), polyamide (PA), an aramid, polyethylene (PE), polyacrylate, polyether sulfone, polysulfone, polypropylene (PP), diacetyl cellulose, polyvinyl chloride. an acrylic resin (PMMA), polycarbonate (PC), an epoxy resin, a urea resin, a urethane resin, a melamine resin, or a cycloolefin polymer (COP).

The thickness of the transparent substrate made from the plastic material may be selected as appropriate depending on the objective, without any specific limitations, and is preferably from 5 μm to 500 μm from a viewpoint of producibility.

<<Dispersion Film Formation>>

Figure 2A:
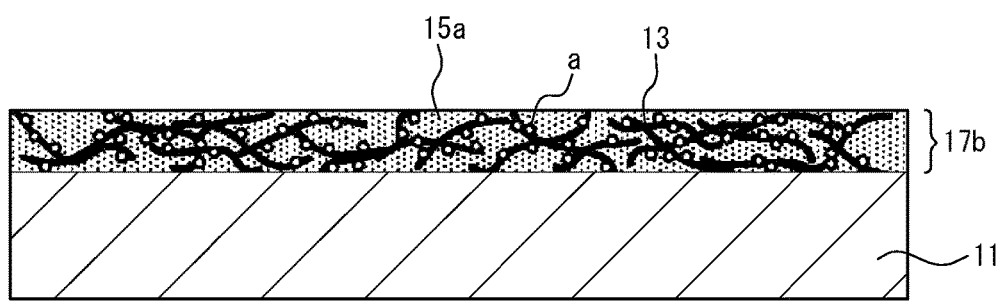
FIGS. 2A and 2B schematically illustrate a formation process of a transparent electrode including a transparent conductive film according to the present disclosure.

Next, as illustrated in FIG. 2A, the dispersion liquid prepared as described above is used to form a dispersion film 17b in which metal nanowire bodies 13 are dispersed on a transparent substrate 11. Colored compound a is present in a situation in which a colored compound has been adsorbed onto the metal nanowires.

The method by which the dispersion film 17b is formed may be selected as appropriate depending on the objective, without any specific limitations, and is preferably a wet film formation method due to physical properties, convenience and production costs.

The wet film formation method may be selected as appropriate depending on the objective, without any specific limitations, and may for example be a commonly known method such as a coating method, a spraying method, or a printing method.

The coating method may be selected as appropriate depending on the objective, without any specific limitations, and may for example be a commonly known coating method such as micro gravure coating, wire bar coating, direct gravure coating, die coating, dipping, spray coating, reverse roll coating, curtain coating, comma coating, knife coating, or spin coating.

The printing method may be selected as appropriate depending on the objective, without any specific limitations, and may for example be relief printing, offset printing, gravure printing, intaglio printing, rubber plate printing, screen printing, or inkjet printing.

The dispersion film 17b is formed in the state described above with the metal nanowire bodies 13 dispersed in a solvent including an uncured transparent resin material (binder) 15*a*. Colored compound a is present in a situation in which a colored compound has been adsorbed onto the metal nanowires.

<<Dispersion Film Drying and Curing>>

Figure 2B:
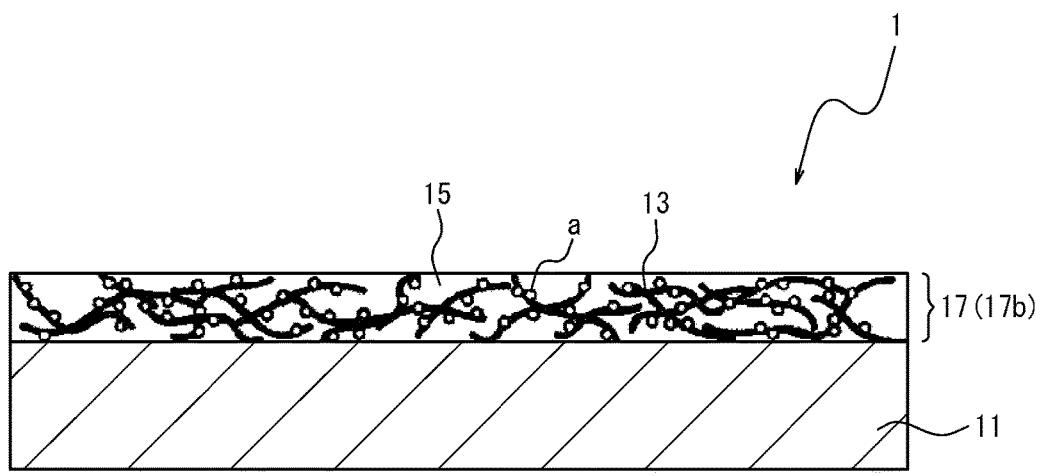

Next, the solvent in the dispersion film 17*b* formed on the transparent substrate 11 is removed by drying as illustrated in FIG. 2B. Thereafter, curing treatment of the uncured binder (transparent resin material) 15*a* is performed to form a wire layer 17 in which the metal nanowire bodies 13 are dispersed in a cured binder (transparent resin material) 15. Colored compound a is present in a situation in which a colored compound has been adsorbed onto the metal nanowires. Removal of the solvent by the drying described above may be performed by natural drying or heated drying. Thereafter, the curing treatment of the uncured binder (transparent resin material) 15*a* is performed such that the metal nanowire bodies 13 are in a dispersed state in the cured transparent resin material 15.

<<Patterning>>

In a situation in which a transparent electrode including an electrode pattern formed by the wire layer 17 is to be prepared, the process of forming the dispersion film 17*b* illustrated in FIG. 2A may involve forming a pre-patterned dispersion film 17*b*. The dispersion film 17*b* can for example be formed in a pattern through a printing method. In an alternative method, the dispersion film 17*b* (wire layer 17) may be pattern etched in a process performed after curing of the formed dispersion film 17*b*. In this situation, pattern etching is performed such that at least the metal nanowire bodies 13 are severed in a region of the dispersion film 17*b* (wire layer 17) that is not to be included in the electrode pattern in order that this region is in an insulating state.

<<Calendering>>

Calendering is preferably performed by roll pressing, flat-plate pressing, or the like in order to reduce a sheet resistance value of the obtained transparent electrode. Note that the calendering may be performed before or after the patterning as required.

<<Other Processing>>

A visibility-reducing fine pattern may be formed in the transparent electrode as required. Visibility-reducing fine patterning is a technique for restricting visibility of an electrode pattern by forming a plurality of hole portions in a transparent electrode and forming a plurality of protruding portions on the surface of an insulating part of a substrate where the transparent electrode is not present. The hole portions and the protruding portions can be formed by an etching method or a printing method in accordance with the contents of Japanese Patent No. 4862969. Through the above, non-visibility of the electrode pattern can be further improved.

Example of Configuration of Transparent Electrode Provided with Overcoating Layer (Modified Example 1)

Figure 3:
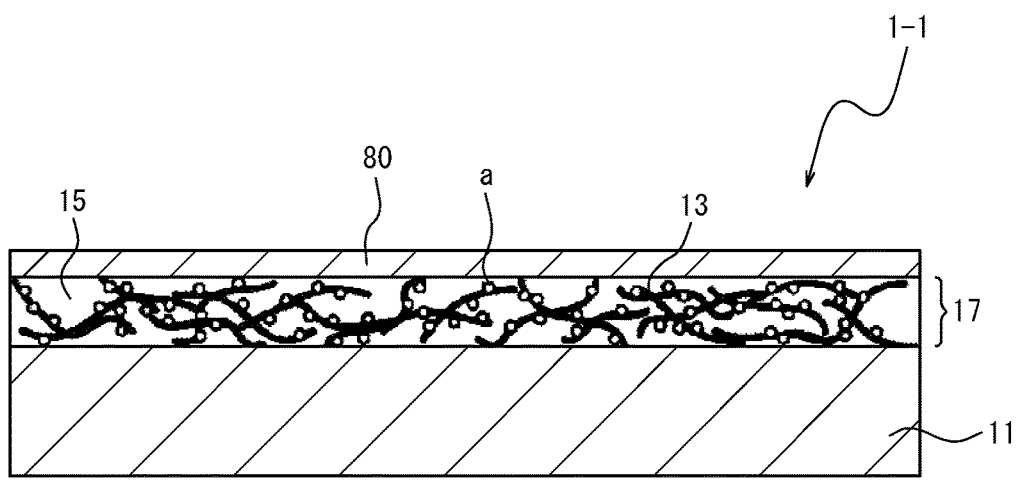
FIG. 3 is a cross-sectional schematic view illustrating an example of configuration (Modified Example 1) of a transparent electrode including a transparent conductive film according to the present disclosure.

FIG. 3 illustrates, as an example of configuration (Modified Example 1) of the transparent electrode, a transparent electrode 1-1 configured by providing an overcoating layer 80 with respect to the transparent electrode of the first embodiment (transparent electrode 1 in FIG. 1). The overcoating layer 80 is provided in order to protect the wire layer 17 formed using the metal nanowire bodies 13 and is disposed at the top of the wire layer 17.

It is important that the overcoating layer 80 transmits visible light. The overcoating layer 80 may for example be made from a polyacrylic-based resin, a polyamide-based resin, a polyester-based resin, or a cellulosic resin, or may be made from a metal alkoxide hydrolysis or dehydration condensation product. The overcoating layer 80 described above is of a film-thickness that does not impair transmission of visible light. The overcoating layer 80 may have one or more functions selected from the group of functions consisting of hard coating, glare prevention, reflection prevention, Newton ring prevention, and blocking prevention.

In a situation in which the overcoating layer 80 is provided, preferably at least a portion of the metal nanowire bodies 13 are exposed through the surface of the overcoating layer 80.

Example of Configuration of Transparent Electrode Provided with Anchor Layer (Modified Example 2)

Figure 4:
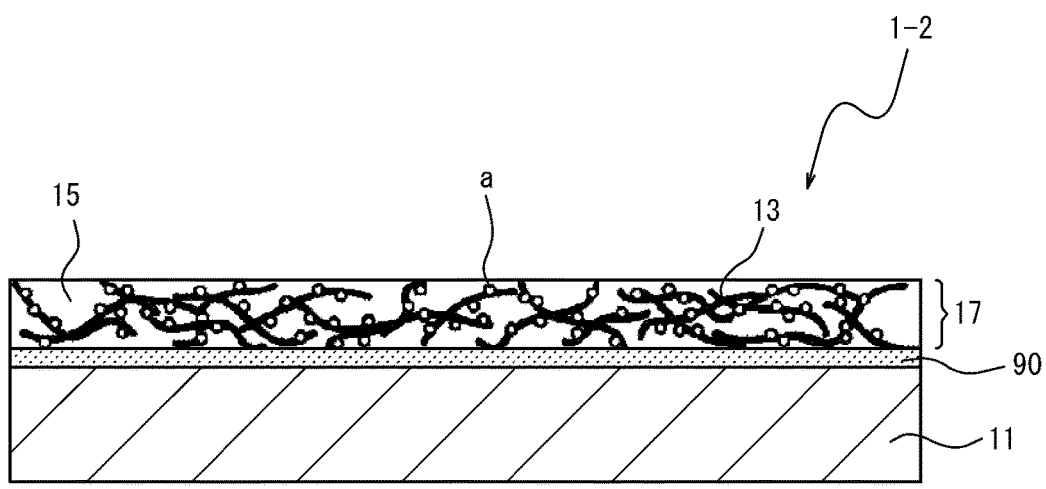
FIG. 4 is a cross-sectional schematic view illustrating an example of configuration (Modified Example 2) of a transparent electrode including a transparent conductive film according to the present disclosure.

FIG. 4 illustrates, as an example of configuration (Modified Example 2) of the transparent electrode, a transparent electrode 1-2 configured by providing an anchor layer 90 with respect to the transparent electrode of the first embodiment (transparent electrode 1 in FIG. 1). The anchor layer 90 is provided in order to ensure close adherence of the transparent substrate 11 and the wire layer 17 formed using the metal nanowires 13 and is sandwiched between the transparent substrate 11 and the wire layer 17.

It is important that the anchor layer 90 transmits visible light. The anchor layer 90 may for example be made from a polyacrylic-based resin, a polyamide-based resin, a polyester-based resin, or a cellulosic resin, or may be made from a metal alkoxide hydrolysis or dehydration condensation product. The anchor layer 90 described above is of a film-thickness that does not impair transmission of visible light.

Modified Example 2 can be used in combination with Modified Example 1. In a situation in which Modified Examples 1 and 2 are combined, the wire layer 17 formed using the metal nanowire bodies 13 is sandwiched between the anchor layer 90 and the overcoating layer 80. Colored compound a is present in a situation in which a colored compound has been adsorbed onto the metal nanowires.

Example of Configuration of Transparent Electrode in which Metal Nanowires are Accumulated without Dispersion in Binder (Transparent Resin Material) (Modified Example 3)

FIG. 5 illustrates, as an example of configuration (Modified Example 3) of the transparent electrode, a transparent electrode 1-3 configured by omitting the binder (transparent resin material) from the transparent electrode in the first embodiment (transparent electrode 1 in FIG. 1). The metal nanowire bodies 13 are accumulated on the transparent substrate 11 without being dispersed in a binder (transparent resin material). Colored compound a is present in a situation in which a colored compound has been adsorbed onto the metal nanowires. A wire layer 17' formed by accumulation of the metal nanowire bodies 13 is disposed on the transparent substrate 11 and maintains close adherence to the surface of the transparent substrate 11. A configuration such as described above is applicable when close adherence between the metal nanowire bodies 13 themselves and between the metal nanowire bodies 13 and the transparent substrate 11 is good.

Modified Example 3 can be combined with either or both of Modified Examples 1 and 2. In other words, Modified Example 3 can be combined with Modified Example 1 to provide an overcoating layer at the top of the wire layer 17' and can be combined with Modified Example 2 to provide an anchor layer between the transparent substrate 11 and the wire layer 17'.

The same effects as the transparent electrode configured as described in the first embodiment can be achieved even for the transparent electrode 1-3 configured as described above so long as the number of metal nanowire bundle structures is 3 or fewer per each rectangular area region of 40 μm×30 μm of the transparent conductive film.

Example of Configuration of Transparent Electrode Provided with Hard Coating Layer on One Main Surface of Substrate (Modified Example 4)

Figure 6:
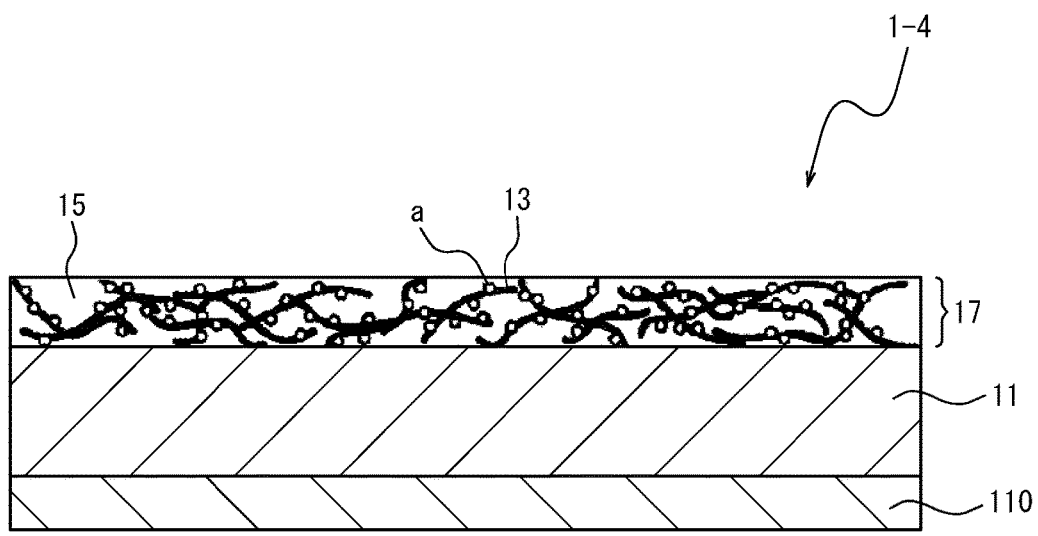
FIG. 6 is a cross-sectional schematic view illustrating an example of configuration (Modified Example 4) of a transparent electrode including a transparent conductive film according to the present disclosure.

FIG. 6 illustrates, as an example of configuration (Modified Example 4) of the transparent electrode, a transparent electrode 1-4 configured by providing a hard coating layer 110 with respect to the transparent electrode of the first embodiment (transparent electrode 1 in FIG. 1). The hard coating layer 110 is provided in order to protect the transparent substrate 11 and is disposed at the bottom of the transparent substrate 11.

It is important that the hard coating layer 110 transmits visible light. The hard coating layer 110 may for example be made from an organic hard coating agent, an inorganic hard coating agent, or an organic-inorganic hard coating agent. The hard coating layer 110 described above is of a film-thickness that does not impair transmission of visible light.

Modified Example 4 can be combined with one or more of Modified Examples 1-3. For example, an overcoating layer or an anchor layer may also be provided. The anchor layer is for example disposed between the transparent substrate 11 and the wire layer 17, between the transparent substrate 11 and the hard coating layer 110, or at both of these locations. The overcoating layer is for example disposed at the top of the wire layer 17, at the bottom of the hard coating layer 110, or at both of these locations.

Example of Configuration of Transparent Electrode Provided with Hard Coating Layer on Both Main Surfaces of Substrate (Modified Example 5)

Figure 7:
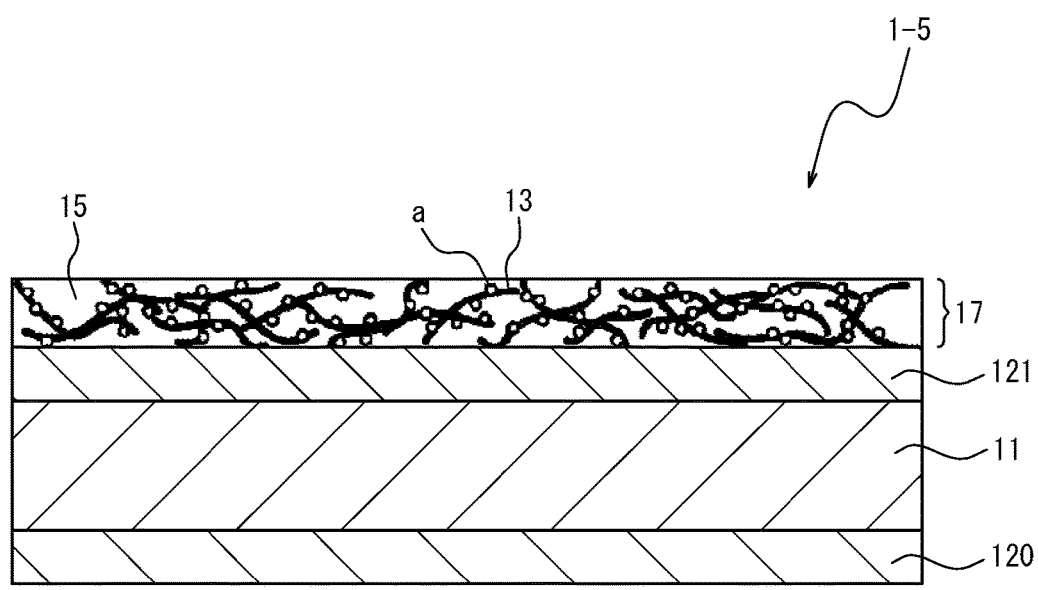
FIG. 7 is a cross-sectional schematic view illustrating an example of configuration (Modified Example 5) of a transparent electrode including a transparent conductive film according to the present disclosure.

FIG. 7 illustrates, as an example of configuration (Modified Example 5) of the transparent electrode, a transparent electrode 1-5 configured by providing hard coating layers 120 and 121 with respect to the transparent electrode of the first embodiment (transparent electrode 1 in FIG. 1). The hard coating layer 120 is provided in order to protect the transparent substrate 11 and disposed at the bottom of the transparent substrate 11. The hard coating layer 121 is provided in order to protect the transparent substrate 11 and disposed at the top of the transparent substrate 11. The wire layer 17 is disposed at the top of the hard coating layer 121.

It is important that the hard coating layers 120 and 121 transmit visible light. The hard coating layers 120 and 121 may for example be made from an organic hard coating agent, an inorganic hard coating agent, or an organic-inorganic hard coating agent. The hard coating layers 120 and 121 described above are of a film-thickness that does not impair transmission of visible light.

Modified Example 5 described above can be combined with one or more of Modified Examples 1-3. For example, an overcoating layer or an anchor layer may also be provided. The anchor layer is for example disposed between the transparent substrate 11 and the hard coating layer 121, between the hard coating layer 121 and the wire layer 17, between the transparent substrate 11 and the hard coating layer 120, or at two or more of these locations. The overcoating layer is for example provided at the top of the wire layer 17, at the bottom of the hard coating layer 120, or at both of these locations.

(Information Input Device)

An information input device according to the present disclosure at least includes a commonly known transparent substrate and the transparent conductive film according to the present disclosure, and may further include other commonly known elements as required (for example, refer to Japanese Patent No. 4893867). As a result of including the transparent conductive film according to the present disclosure, the information input device has excellent black floating prevention (photopic contrast) and electrode pattern non-visibility.

The information input device may be selected as appropriate depending on the objective, without any specific limitations, and may for example be a touch panel such as described in Japanese Patent No. 4893867.

(Electronic Device)

An electronic device according to the present disclosure at least includes a commonly known touch panel and the transparent conductive film according to the present disclosure, and may further include other commonly known elements as required (for example, refer to Japanese Patent No. 4893867). As a result of including the transparent conductive film according to the present disclosure, the electronic device has excellent black floating prevention (photopic contrast) and electrode pattern non-visibility.

The electronic device may be selected as appropriate depending on the objective, without any specific limitations, and may for example be a television, a digital camera, a notebook personal computer, a video camera, or a mobile terminal such as described in Japanese Patent No. 4893867.

EXAMPLES

Examples 1-4 were prepared as transparent conductive films according to the present disclosure and Comparative Examples 1-4 were prepared as comparative transparent conductive films as described below. The physical properties of the transparent conductive films were evaluated. Evaluation results for each of the examples are shown in Table 1.

Example 1

Silver nanowires [1] (AgNW-25 (average diameter 25 nm, average length 23 μm) produced by Seashell Technology, LLC.) were used as metal nanowire bodies.

The silver nanowires [1], water, and ethanol were mixed and were subjected to stream dispersion treatment by being passed through a wet-type stream dispersing apparatus. The stream dispersion treatment was performed with dispersion treatment conditions of a plunger pump pressure of 1.0 MPa and by three passes through a flow channel having a diameter of 0.5 mm and a length of 300 mm. Next, the stream dispersion treated product was mixed with a water-soluble photosensitive resin (AWP-MRH produced by Toyo Gosei Co., Ltd.). The silver nanowires [1], water, ethanol, and water-soluble photosensitive resin were adjusted to the amounts shown below.

Silver nanowires [1]: 0.065 mass %
Water-soluble photosensitive resin (AWP-MRH produced by Toyo Gosei Co., Ltd.): 0.130 mass %
Water: 89.805 mass %
Ethanol: 10 mass %

Next, the resultant dispersion liquid was coated onto a transparent substrate by a 10 count coil bar to form a dispersion film. The silver nanowires had a mass per unit area of 0.013 g/m². The transparent substrate was PET (Lumirror U34 produced by Toray Industries, Inc.) having a film thickness of 125

Next, warm air was blown against the coated surface using a dryer in atmospheric conditions to remove solvent from the dispersion film by drying. Thereafter, a metal halide lamp was used to radiate ultraviolet rays with an integrated light intensity of 200 mJ/cm² to the silver nanowire layer in atmospheric conditions in order to cure the water-soluble photosensitive resin (binder).

Calendering was subsequently performed (nip width 1 mm, load 4 kN, speed 1 m/minute).

Example 2

A transparent electrode was prepared in the same way as in Example 1 with the exception that the composition of the coating material in Example 1 was changed as shown below.
Silver nanowires [1]: 0.04 mass %
Water-soluble photosensitive resin (AWP-MRH produced by Toyo Gosei Co., Ltd.): 0.08 mass %
Water: 89.88 mass %
Ethanol: 10 mass %

Example 3

Silver nanowires [1] (AgNW-25 (average diameter 25 nm, average length 23 μm) produced by Seashell Technology, LLC.) were used as metal nanowire bodies.

A colored compound (dye) was prepared by the following procedure.

Lanyl Black BG E/C produced by Taoka Chemical Co., Ltd. and 2-aminoethanethiol hydrochloride produced by Wako Pure Chemical Industries, Ltd. were mixed with a mass ratio of 4:1 in an aqueous medium. The mixed solution was caused to react for 100 minutes using an ultrasonic cleaner and was then left for 15 hours. The reaction liquid was filtered through a mixed cellulose ester type membrane filter having a pore diameter of 3 μm. Thereafter, the resultant solid was washed with water three times and was then dried at 100° C. in a vacuum oven to obtain a dye [I].

A 0.2 mass % ethanol solution of the dye [I] was prepared. Next, a fluorine resin filter paper tube No. 89 produced by Advantec MFS, INC. was dampened with ethanol and then immersed in the dye [I] ethanol solution. Once the dye [I] ethanol solution started to filter through the filter paper tube, 0.025 g of the silver nanowires [1] were added into the inside of the filter paper tube.

This setup was heated to 70° C. for 4 hours in order to cause adsorption of the dye [I] onto the silver nanowires [1] to obtain silver nanowires [2] having the colored compound adsorbed thereon. The filter paper tube was removed from the dye [I] ethanol solution after returning to room temperature after heating. Next, ethanol washing was performed repeatedly by adding ethanol into the inside of the filter paper tube until the filtrate appeared colorless and transparent to the naked eye.

The washed silver nanowires [2] were collected and the amount of the dye [I] that had been adsorbed onto the silver nanowires [1] in the silver nanowires [2] was measured and calculated by STEM EDS.

Measurement by STEM EDS was performed using an EM-002B produced by Topcon Technohouse Corporation and a system6 produced by Thermo Fisher Scientific K.K.

Note that EDS measurement was performed by making four measurements per one sample of the silver nanowires [2] and taking an average value of the measurements to be the measured value.

It was confirmed through the EDS measurement that 92.6 mass % of Ag and 0.2 mass % of S were present in the silver nanowires [2].

The dye [I] had a chemical formula $C_{40}H_{34}N_9O_{13}S_3Cr_1$ and a molecular mass of 997. The adsorbed amount of the dye [I] was calculated from the chemical formula and the molecular mass as shown below.

0.2/92.6=0.00216 (mass ratio of S relative to Ag)
96/997=0.0963 (mass ratio of S relative to the dye [I])
0.00216/0.0963×100=2.24 mass %

Accordingly, the amount of the dye [I] that was adsorbed onto the silver nanowires [1] in the silver nanowires [2] of Example 3 was shown to be approximately 2.2 mass %. Note that the adsorbed amount of the dye [I] was measured and calculated by the same method in Example 4 and Comparative Examples 3 and 4 in which the same dye [I] was used.

A transparent electrode was prepared in the same way as in Example 1 with the exception that the obtained silver nanowires [2] were used in Example 1.

Example 4

A transparent electrode was prepared in the same way as in Example 3 with the exception that the composition of the coating material in Example 3 was changed as shown below.
Silver nanowires [2]: 0.04 mass %
Water-soluble photosensitive resin (AWP-MRH produced by Toyo Gosei Co., Ltd.): 0.08 mass %
Water: 89.88 mass %
Ethanol: 10 mass %

Comparative Example 1

A transparent electrode was prepared in the same way as in Example 1 with the exception that the stream dispersion treatment by passage through the wet-type stream dispersing apparatus in Example 1 was not performed.

Comparative Example 2

A transparent electrode was prepared in the same way as in Example 2 with the exception that the stream dispersion treatment by passage through the wet-type stream dispersing apparatus in Example 2 was not performed.

Comparative Example 3

A transparent electrode was prepared in the same way as in Example 3 with the exception that the stream dispersion treatment by passage through the wet-type stream dispersing apparatus in Example 3 was not performed.

Comparative Example 4

A transparent electrode was prepared in the same way as in Example 4 with the exception that the stream dispersion treatment by passage through the wet-type stream dispersing apparatus in Example 4 was not performed.

<Evaluation>

Evaluation of the transparent conductive films prepared in Examples 1-4 and Comparative Examples 1-4 described above was performed for (A) bundles, (B) total light transmittivity [%], (C) haze value, (D) sheet resistance value [Ω/sq.], and (E) Δreflection L* value. These evaluations were performed as follows.

(A) Evaluation of Bundles

Bundles in each of the transparent conductive films were evaluated in accordance with the following evaluation standard using a field-emission scanning electron microscope (product name: S-4700, produced by Hitachi) at ×2000 magnification.

tions by an SCE (specular component excluded) method was taken to be a reflection L* value. Herein, the Δreflection L* value can be calculated using the following formula.

ΔReflection L* value=(Reflection L* value of transparent electrode including substrate)−(Reflection L* value of substrate)

Note that the Δreflection L* value is preferably no greater than 2.5 and more preferably no greater than 1.5.

TABLE 1

Figure 9:
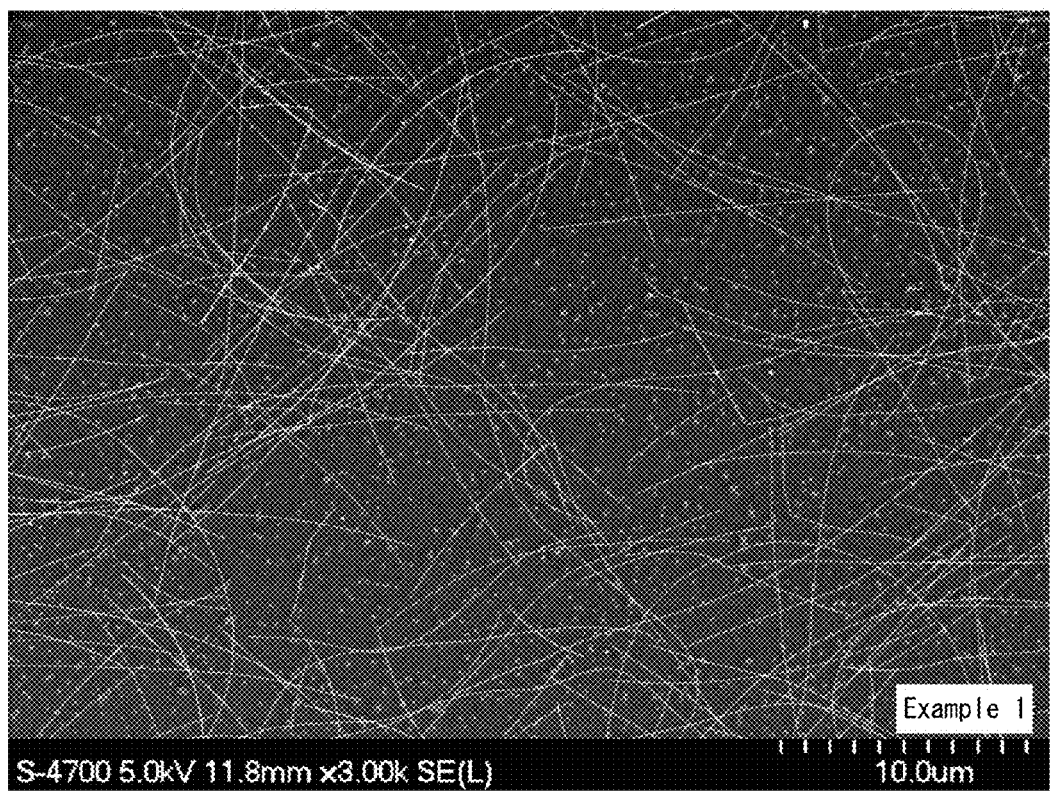
FIG. 9 is a scanning electron microscope (SEM) image of Example 1.
Figure 10:
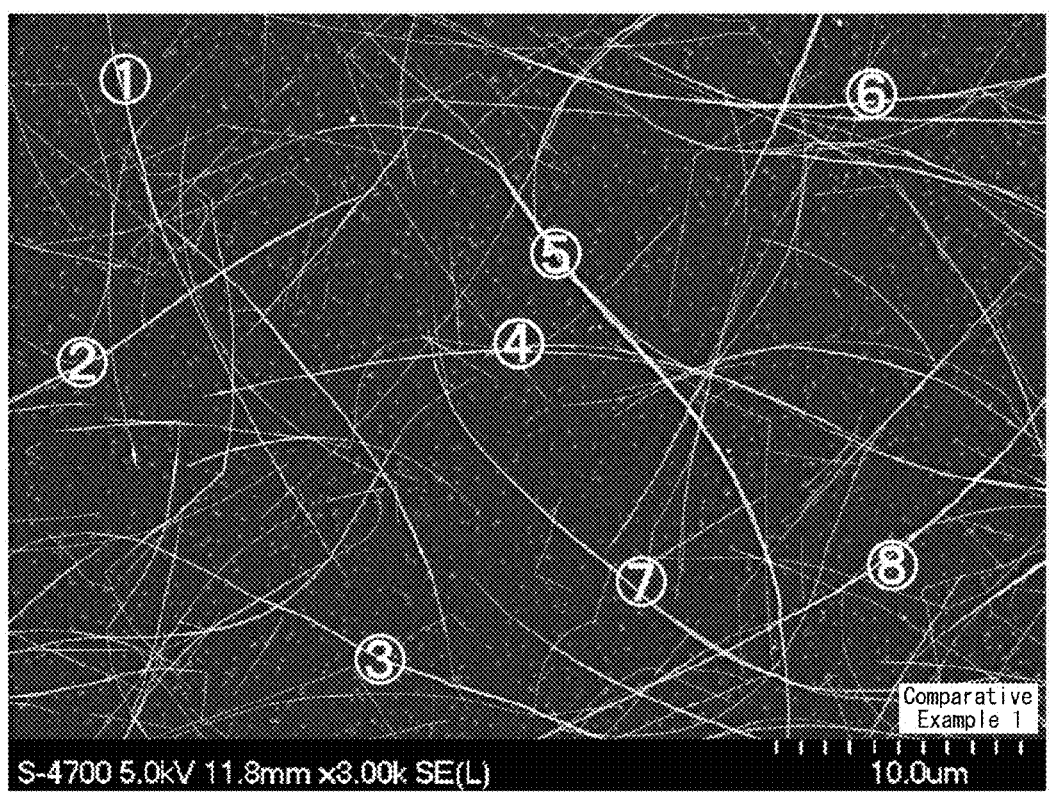
FIG. 10 is a scanning electron microscope (SEM) image of Comparative Example 1.
Figure 11:
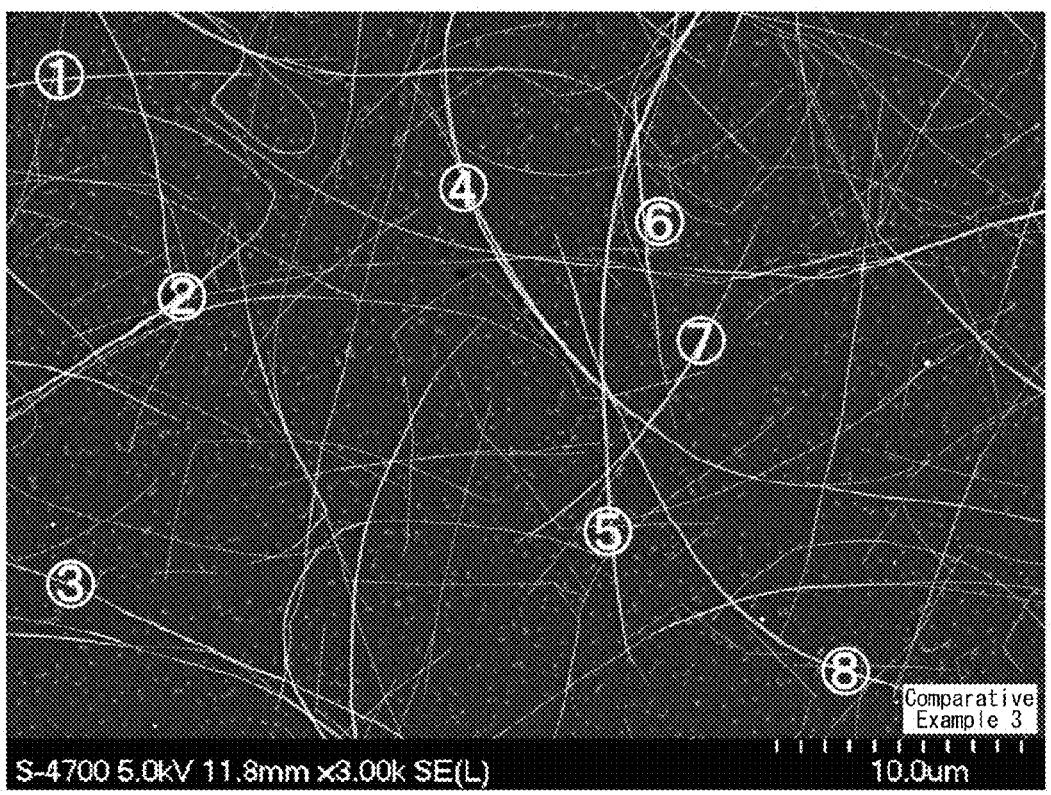
FIG. 11 is a scanning electron microscope (SEM) image of Comparative Example 3.

| | Metal nanowires | Colored compound Yes/No | Adsorbed amount of colored compound relative to metal nanowire bodies Mass % | (A) Bundle structures | SEM image | (B) Total light transmittivity % | (C) Haze value | (D) Sheet resistance value Ω/m² | (E) ΔReflection L* value |
|---|---|---|---|---|---|---|---|---|---|
| Example 1 | Silver nanowires [1] | No | 0.0 | Good | FIG. 9 | 91.5 | 1.1 | 100 | 2.5 |
| Example 2 | Silver nanowires [1] | No | 0.0 | Good | — | 92.0 | 0.9 | 200 | 1.8 |
| Example 3 | Silver nanowires [2] | Yes | 2.2 | Good | — | 91.8 | 0.9 | 100 | 1.7 |
| Example 4 | Silver nanowires [2] | Yes | 2.2 | Good | — | 92.0 | 0.8 | 200 | 1.1 |
| Comparative Example 1 | Silver nanowires [1] | No | 0.0 | Poor | FIG. 10 | 90.9 | 1.3 | 210 | 3.1 |
| Comparative Example 2 | Silver nanowires [1] | No | 0.0 | Poor | — | 91.4 | 1.2 | 440 | 2.3 |
| Comparative Example 3 | Silver nanowires [2] | Yes | 2.2 | Poor | FIG. 11 | 90.5 | 1.1 | 230 | 2.3 |
| Comparative Example 4 | Silver nanowires [2] | Yes | 2.2 | Poor | — | 91.3 | 1.0 | 560 | 1.8 |

Good: The number of bundle structures in a rectangular area region of 30 μm in height and 40 μm in width of the transparent conductive film is 3 or fewer at each of three randomly selected locations in a plane of the transparent conductive film.

Poor: The number of bundle structures in a rectangular area region of 30 μm in height and 40 μm in width of the transparent conductive film is 4 or more at any of the aforementioned locations.

(B) Evaluation of Total Light Transmittivity

The total light transmittivity of each of the transparent conductive films was evaluated in accordance with JIS K7136 using an HM-150 (product name, produced by Murakami Color Research Laboratory Co., Ltd.).

(C) Evaluation of Haze Value

The haze value of each of the transparent conductive films was evaluated in accordance with JIS K7136 using an HM-150 (product name, produced by Murakami Color Research Laboratory Co., Ltd.). Note that a haze value of no greater than 1.1 is preferable.

(D) Evaluation of Sheet Resistance Value

The sheet resistance value of each of the transparent conductive films was evaluated using an MCP-T360 (product name, produced by Mitsubishi Chemical Analytech Co., Ltd.). Note that a sheet resistance value of no greater than 500 Ω/sq. is preferable.

(E) Evaluation of Δreflection L* Value

Black plastic tape (VT-50 produced by Nichiban Co., Ltd.) was attached at the silver nanowire layer-side and the Δreflection L* value was evaluated from the opposite side to the silver nanowire layer-side in accordance with JIS Z8722 using a Color i5 Benchtop produced by Videojet X-Rite K.K. The light source was a D65 light source and an average value of measurements performed at three arbitrary loca- The results shown in Table 1 provided confirmation of the following.

First, comparison of Example 1 with Example 3 and Example 2 with Example 4 shows that a lower haze value and Δreflection L* value were obtained, and thus more favorable results, when silver nanowire bodies having a colored compound adsorbed thereon were used (Examples 3 and 4) compared to when silver nanowires that did not have a colored compound adsorbed thereon were used (Examples 1 and 2). This is thought to occur as a result of scattering of external light being inhibited due to adsorption of the colored compound onto the surfaces of the silver nanowire bodies.

Furthermore, comparison of Example 1 with Comparative Example 1, Example 2 with Comparative Example 2, Example 3 with Comparative Example 3, and Example 4 with Comparative Example 4 shows that a lower haze value and Δreflection L* value were obtained when bundle structures were not present or were only present in a very small number (Examples 1-4), regardless of the fact that the mass of silver nanowires present in the transparent conductive film was substantially the same. This is thought to occur as a result of conductivity being efficiently obtained while also inhibiting scattering of external light due to bundle structures not being present or being present only in a very small number.

Note that FIG. 9 is a scanning electron microscope (SEM) image of Example 1, FIG. 10 is a scanning electron microscope (SEM) image of Comparative Example 1, and FIG. 11 is scanning electron microscope (SEM) image of Comparative Example 3.

The number of bundle structures is 0 in FIG. 9 (Example 1), 8 or more in FIG. 10 (Comparative Example 1), and 8 or more in FIG. 11 (Comparative Example 3).

REFERENCE SIGNS LIST 1, 1-1, 1-2, 1-3, 1-4, 1-5 transparent electrode
11 transparent substrate
13 metal nanowire body
15, 15a binder (transparent resin material)
17, 17', 17b wire layer (dispersion film, transparent conductive film)
80 overcoating layer
90 anchor layer
110, 120, 121 hard coating layer
a colored compound

The invention claimed is:

1. A transparent conductive film comprising one or more metal nanowires, wherein
the number of metal nanowire bundle structures present in the transparent conductive film is 3 or fewer per each rectangular area region of 30 μm in height and 40 μm in width of the transparent conductive film,
the metal nanowires include metal nanowire bodies and a colored compound adsorbed onto the metal nanowire bodies, and
the colored compound is a dye.

2. The transparent conductive film of claim 1, wherein the colored compound is adsorbed in an amount of from 0.5 mass % to 10 mass % relative to the metal nanowire bodies.

3. The transparent conductive film of claim 1, wherein the dye absorbs visible region light.

4. The transparent conductive film of claim 1, wherein the metal nanowire bodies have an average minor axis diameter of from 1 nm to 500 nm and an average major axis length of from 5 μm to 50 μm.

5. The transparent conductive film of claim 1, wherein the metal nanowire bodies include, as a constituent, at least one element selected from the group consisting of Ag, Au, Ni, Cu, Pd, Pt, Rh, Ir, Ru, Os, Fe, Co, Sn, Al, Tl, Zn, Nb, Ti, In, W, Mo, Cr, V, and Ta.

6. The transparent conductive film of claim 5, wherein a Δreflection L* value is no greater than 2.5.

7. The transparent conductive film of claim 5, further comprising
a binder, wherein
the metal nanowires are dispersed in the binder.

8. The transparent conductive film of claim 5, wherein the metal nanowires are accumulated on a substrate.

9. An information input device comprising:
a transparent substrate; and
the transparent conductive film of claim 1 disposed above the transparent substrate.

10. An electronic device comprising:
a display panel; and
the transparent conductive film of claim 1 disposed at a display surface-side of the display panel.

11. A transparent conductive film comprising one or more metal nanowires, wherein
the number of metal nanowire bundle structures present in the transparent conductive film is 3 or fewer per each rectangular area region of 30 μm in height and 40 μm in width of the transparent conductive film,
the metal nanowires include metal nanowire bodies and a colored compound adsorbed onto the metal nanowire bodies, and
the colored compound includes a chromophore that absorbs visible region light and a group that bonds to a constituent metal of the metal nanowire bodies.

12. The transparent conductive film of claim 11, wherein the colored compound is adsorbed in an amount of from 0.5 mass % to 10 mass % relative to the metal nanowire bodies.

13. The transparent conductive film of claim 11, wherein the colored compound is represented by general formula (I) shown below $$R-X \qquad (I)$$

where R is a chromophore that absorbs visible region light and X is a group that bonds to a constituent metal of the metal nanowire bodies.

14. The transparent conductive film of claim 11, wherein the chromophore includes at least one selected from the group consisting of an unsaturated alkyl group, an aromatic ring, a heterocyclic ring, and a metal ion.

15. The transparent conductive film of claim 11, wherein the chromophore includes at least one selected from the group consisting of a nitroso group, a nitro group, an azo group, a methine group, an amino group, a ketone group, a thiazolyl group, a naphthoquinone group, an indoline group, a stilbene derivative, an indophenol derivative, a diphenylmethane derivative, an anthraquinone derivative, a triarylmethane derivative, a diazine derivative, an indigoid derivative, a xanthene derivative, an oxazine derivative, a phthalocyanine derivative, an acridine derivative, a thiazine derivative, a sulfur atom-containing compound, and a metal ion-containing compound.

16. The transparent conductive film of claim 15, wherein the chromophore includes at least one selected from the group consisting of a Cr complex, a Cu complex, a Co complex, a Ni complex, an Fe complex, an azo group, and an indoline group.

17. The transparent conductive film of claim 11, wherein the group that bonds to the constituent metal is either or both of a thiol group and a disulfide group.

* * * * *